(12) United States Patent
Kobayashi et al.

(10) Patent No.: US 7,706,268 B2
(45) Date of Patent: Apr. 27, 2010

(54) TRANSMISSION DEVICE

(75) Inventors: Masato Kobayashi, Kawasaki (JP); Masashige Kawarai, Kawasaki (JP); Yasushi Tateno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 11/835,875

(22) Filed: Aug. 8, 2007

(65) Prior Publication Data

US 2008/0068984 A1    Mar. 20, 2008

(30) Foreign Application Priority Data

Sep. 20, 2006 (JP) .............................. 2006-255004

(51) Int. Cl.
*G08C 15/00* (2006.01)
*H04L 1/00* (2006.01)

(52) U.S. Cl. .................... 370/230; 370/229; 370/230.1; 370/235

(58) Field of Classification Search ................. 370/230, 370/217, 395.1
See application file for complete search history.

(56) References Cited

U.S. PATENT DOCUMENTS

| 5,187,706 | A * | 2/1993 | Frankel et al. ............... 370/217 |
| 6,498,794 | B1 * | 12/2002 | Tsukamoto et al. ....... 370/395.1 |
| 6,501,758 | B1 * | 12/2002 | Chen et al. ................ 370/395.1 |
| 6,714,516 | B1 * | 3/2004 | Todd ........................... 370/235 |
| 7,155,120 | B1 * | 12/2006 | Ofek et al. ...................... 398/7 |
| 7,310,356 | B2 * | 12/2007 | Abdo et al. ................... 370/522 |
| 7,342,877 | B1 * | 3/2008 | Ervin et al. .................. 370/225 |
| 7,359,323 | B2 * | 4/2008 | Magill et al. ................. 370/230 |
| 7,400,828 | B1 * | 7/2008 | Oren et al. ....................... 398/3 |
| 2001/0024540 | A1 * | 9/2001 | Ibukuro et al. ................ 385/17 |
| 2002/0191538 | A1 * | 12/2002 | Ono ............................ 370/222 |
| 2003/0142678 | A1 * | 7/2003 | Chan et al. ................ 370/395.1 |
| 2004/0001579 | A1 * | 1/2004 | Feinberg et al. ............. 379/156 |
| 2004/0085899 | A1 * | 5/2004 | Magill et al. ................. 370/230 |
| 2004/0114511 | A1 * | 6/2004 | Mochizuki et al. .......... 370/217 |
| 2004/0151499 | A1 * | 8/2004 | Ibukuro et al. ................ 398/45 |
| 2007/0070899 | A1 * | 3/2007 | Okuda et al. ................. 370/230 |
| 2008/0226292 | A1 * | 9/2008 | Li et al. ......................... 398/48 |

FOREIGN PATENT DOCUMENTS

WO        WO 01/61937         8/2001

* cited by examiner

*Primary Examiner*—Chi H Pham
*Assistant Examiner*—Robert Lopata
(74) *Attorney, Agent, or Firm*—Katten Muchin Roseman LLP

(57) ABSTRACT

A transmission device capable of detecting and discarding duplicate data transmitted over Work and Protection paths of a ring network. An add/drop multiplexer adds/drops and cross-connects signals. When an FS-R control signal, for example, is received, a bridge distributes the signal output from the add/drop multiplexer to the Work and Protection routes of the ring network. When the signal distribution is executed by the bridge, a discard information inserter inserts discard information into the signal output to the Work route by the bridge. A discard information detector determines whether or not the discard information is included in the signal dropped by the add/drop multiplexer. A signal discarder discards the dropped signal, depending on whether the discard information is detected by the discard information detector.

10 Claims, 19 Drawing Sheets

TRANSMISSION DEVICE

CROSS-REFERENCE TO RELATED APPLICATIONS

This application is based upon and claims the benefits of priority from the prior Japanese Patent Application No. 2006-255004, filed on Sep. 20, 2006, the entire contents of which are incorporated herein by reference.

BACKGROUND OF THE INVENTION

1. Field of the Invention

The present invention relates to transmission devices, and more particularly, to a transmission device constituting a ring network and adapted to add/drop data.

2. Description of the Related Art

Transmission devices constituting a ring network (e.g., SONET (Synchronous Optical Network)/SDH (Synchronous Digital Hierarchy) transmission devices) are generally configured in compliance with an architecture called BLSR (Bi-directional Line Switched Ring) or UPSR (Unidirectional Path Switched Ring) to cope with communication failure.

FIG. 17 is a block diagram of a conventional transmission device configured according to BLSR. As shown in the figure, the transmission device has an ADM (Add/Drop Multiplexer)/BLSR unit 200. The ADM/BLSR unit 200 includes an ADM 201, an EoS (Ethernet Over SDH) 202, switches (SW) 203 and 204, and bridges (BR) 205 and 206. In the following, explanation is made on the assumption that the network is based on SDH but applies also to the case where the network is based on SONET.

The ADM 201 adds/drops and cross-connects signals path by path. The EoS 202 converts Ethernet (registered trademark) packets received from a lower-level network into ADD path frames for the SDH network. Also, the EoS 202 converts DROP path frames of the SDH network, output from the ADM 201, into Ethernet packets, which are then output to the lower-level network.

The switches 203 and 204 individually perform Work (W)/Protection (P) route switching, on a section-by-section basis, of signals to be input to the ADM 201. The bridges 205 and 206 each operate in response to a control signal to distribute the signal output from the ADM 201 to the Work and Protection routes. In FIG. 17, the solid lines (except those extending downward from the ADM 201) represent the Work routes of the ring network, and the dashed lines represent the Protection routes.

FIG. 18 shows an exemplary configuration of a BLSR network using the conventional transmission devices. As illustrated, nodes (transmission devices) 211 through 226 are connected in a ring. Each of the nodes 211 to 226 functions as the transmission device shown in FIG. 17. The node 211 is an ADD node and the node 226 is a DROP node. The nodes 211 to 226 provide SDH/SONET transmission of Ethernet packets by means of a path (Work path) along the Work route indicated by arrows 231. Redundancy switching of the nodes 211 to 226 is executed in conformity to Bellcore GR-1230.

Also, FIG. 18 shows parts of the nodes 225 and 226 in detail, as indicated by arrows 233. The node 225 has an ADM 225a and a bridge 225b respectively corresponding to the ADM 201 and the bridge 206 shown in FIG. 17. The node 226 has an ADM 226a and a switch 226b respectively corresponding to the ADM 201 and the switch 204 shown in FIG. 17.

Let it be assumed here that FS-R (Forced Switch-Ring; path switching by the operator) is executed in the span between the nodes 225 and 226. For example, the operator operates his/her terminal such that FS-R/IDLE is output from the node 226, as indicated by arrow 234.

In response to the FS-R request, the node 225 carries out bridging. Specifically, signal (data) is distributed by the bridge 225b in the manner shown in FIG. 18, so that the data is transmitted through the Work path indicated by the arrows 231 as well as the path (Protection path) along the Protection route indicated by arrows 232. Namely, identical data arrives at the node 226 via the Work and Protection paths indicated by the arrows 231 and 232, respectively.

However, the Protection path has a transmission path length longer than that of the Work path by 15 spans (span between the nodes 225 and 224+ span between the nodes 224 and 223+ . . . + span between the nodes 211 and 226). At the node 226, therefore, a delay skew is caused between the data received from the Work path and the same data received from the Protection path. For example, where the transmission distance of one span is 80 km at a maximum, the fiber delay skew is about 6 ms at a maximum, and if the transmission delay caused per node is about 0.1 ms, then the data delay skew between the Work and Protection paths is about 7.5 ms. Thus, while the bridging is performed in the node 225, the data arriving at the node 226 via the Protection path is delayed for the data delay skew with respect to the data arriving at the same node via the Work path. At this point of time, the switch 226b of the node 226 is not yet switched to the Protection path, that is, switching is not yet executed; therefore, the node 226 drops the data received via the Work path.

FIG. 19 shows the network after the switching. In FIG. 19, like reference numerals are used to denote like elements appearing in FIG. 18, and description of such elements is omitted.

After the bridging is executed, the node 225 transmits information indicating completion of bridging (FS-R/Br) to the node 226 along the route indicated by arrow 235. On receiving the information, the node 226 causes the switch 226b to switch the DROP path from the Work path to the Protection path, so that the ADM 226a drops the data received via the Protection path, instead of the Work path.

At this time, duplicate data corresponding to the delay skew between the Work and Protection paths is dropped from the node 226. Where the transmission rate of the transmission paths is 10 Gbps, for example, 75-Mbit duplicate data is output. Such a phenomenon occurs when a BLSR is switched in response to FS-R, SD-R (Signal Degrade-Ring) or MS-R (Manual Switching-Ring). A similar problem also arises in a UPSR due to the delay caused at the time of active/standby switching.

In actual operation, duplication of data often takes place when FS-R/MS-R control is executed for the purpose of maintenance of communication lines. Data duplication in the SDH network may cause no particular problem during the maintenance. Recently, however, a major part of data conveyed over transmission paths is packet data such as Ethernet packets, and thus, data duplication causes increase in the IP traffic of networks to which the data is dropped.

Usually, duplicate packets are discarded by IP routers or the like. Depending on connected devices, however, duplicate packets may possibly cause critical failure such as data destruction or traffic disruption. Especially, where duplicate packets are generated in a transmission device constituting the backbone of a network, the network may possibly encounter a fatal failure.

For SONET/SDH rings, a means for realizing a non-momentary-interruption path by UPSR has been proposed as a means to prevent data duplication. In this connection, an optically bidirectional ring switching method has been proposed in which UPSR is fused into BLSR to realize a non-momentary-interruption path by the BLSR system, thereby providing two advantages of high line capacity efficiency and high line reliability and also making it possible to decrease memory capacity (see, e.g., International Publication No. WO 01/061937).

However, conventional transmission devices do not have a means to prevent packet duplication caused at the time of active/standby switching. Thus, to eliminate the drawback, routers or the like are connected to the ADD/DROP ports of a SONET/SDH ring, or duplicate packet filters using EoE (Ethernet over Ethernet) techniques etc. are provided at the ADD/DROP ports. It is therefore necessary that the individual ADD/DROP ports of the SONET/SDH ring should be provided with routers or filters, which lowers traffic rate and increases costs.

On the other hand, the switching method realizing a non-momentary-interruption path requires that identical data should always be passed via the Work and Protection paths, as in UPSR, and thus cannot be applied to BLSR.

SUMMARY OF THE INVENTION

The present invention was created in view of the above circumstances, and an object thereof is to provide a transmission device capable of detecting data duplication and discarding duplicate data, thereby preventing duplicate packets from being output to a data drop side.

To achieve the object, there is provided a transmission device constituting a ring network. The transmission device comprises an add/drop multiplexer for adding/dropping and cross-connecting signals, a bridge operative in response to a control signal to distribute a signal output from the add/drop multiplexer to work and protection routes of the ring network, a discard information inserter, responsive to the distribution of the signal by the bridge, for inserting discard information into the signal output to the work route, a discard information detector for determining whether or not the discard information is included in a signal dropped by the add/drop multiplexer, and a signal discarder for discarding the dropped signal, depending on whether the discard information is detected by the discard information detector.

Also, to achieve the above object, there is provided a transmission device constituting a ring network. The transmission device comprises an add/drop multiplexer for adding/dropping and cross-connecting signals, a continuity information inserter for inserting, into a signal to be added by the add/drop multiplexer, continuity information that varies sequentially, a continuity information detector for detecting the continuity information included in a signal dropped by the add/drop multiplexer, and a signal discarder for discarding the dropped signal, depending on whether the continuity information detected by the continuity information detector shows continuity.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will be described in detail below with reference to the accompanying drawings.

Figure 1:
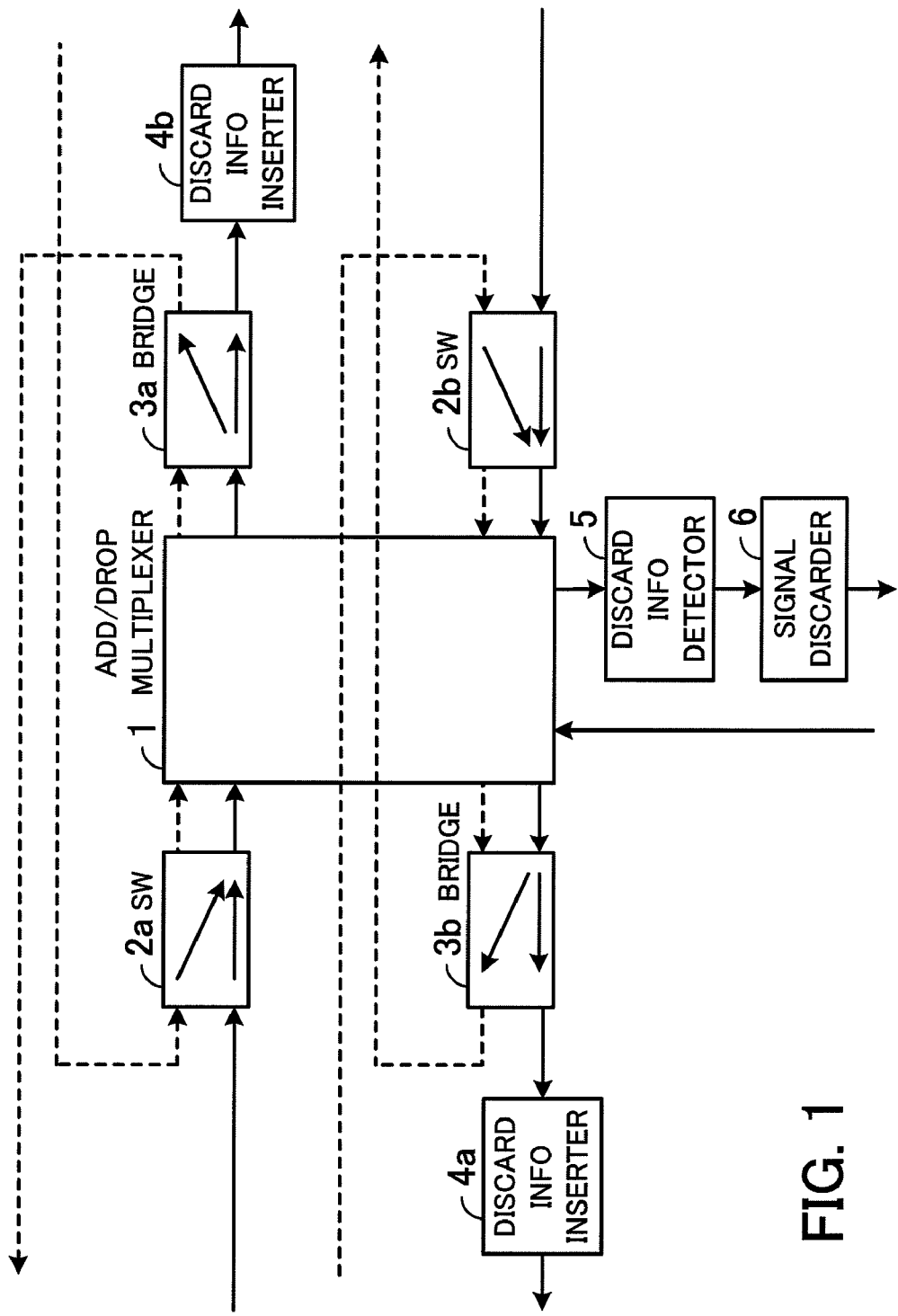
FIG. 1 schematically illustrates a transmission device.

FIG. 1 schematically illustrates a transmission device. As illustrated, the transmission device includes an add/drop multiplexer 1, switches (SW) 2a and 2b, bridges 3a and 3b, discard information inserters 4a and 4b, a discard information detector 5, and a signal discarder 6.

The add/drop multiplexer 1 adds/drops and cross-connects signals.

The bridges 3a and 3b each operate in a manner such that when an FS-R control signal, for example, is received, the signal output from the add/drop multiplexer 1 is distributed to Work and Protection routes of the ring network. In FIG. 1, the solid lines (except those extending downward from the add/drop multiplexer 1) indicate the Work routes of the ring network, and the dashed lines indicate the Protection routes.

When signal distribution is executed by the bridge 3a, 3b in response to FS-R, for example, the discard information inserter 4b, 4a inserts discard information into the signal output to the Work route by the bridge 3a, 3b.

The discard information detector 5 determines whether or not the discard information is included in the signal dropped by the add/drop multiplexer 1.

The signal discarder 6 discards the dropped signal, depending on whether the discard information is detected by the discard information detector 5. Specifically, if the discard information is detected by the discard information detector 5, the signal discarder 6 discards the dropped signal.

On receiving a response from a different transmission device that has executed bridging, the switch 2a, 2b outputs the signal received from either the Work or Protection route to the add/drop multiplexer 1.

The operation of the transmission device will be now described.

When FS-R is received, the bridge 3a, 3b distributes the signal output from the add/drop multiplexer 1 to the Work and Protection routes. Consequently, an identical signal is transmitted, via the Work and Protection routes of the ring network, with the result that a signal-dropping transmission device that is dropping the signal receives the same signal via the two routes.

The discard information inserter 4a, 4b inserts discard information into the signal output to the Work route by the corresponding bridge 3b, 3a.

In the signal-dropping transmission device, the discard information detector 5 determines whether or not the discard information is included in the signal dropped by the add/drop multiplexer 1. If the discard information is included in the dropped signal, the signal discarder 6 discards the signal.

Specifically, where FS-R switching control (signal distribution) is executed in a bridging transmission device, the signal-dropping transmission device receives the same signal via the Work and Protection routes of the ring network. In this case, the discard information is included in the signal transmitted via the Work route, and therefore, by discarding the signal received via the Work route, it is possible to prevent duplicate data from being output to the lower-level network. Namely, the signal-dropping transmission device drops only the Protection route signal of the two identical signals.

Thus, in the transmission device of the present invention, when a signal is distributed to the Work and Protection routes by the bridge 3a, 3b, the discard information is inserted into the signal distributed to the Work route. The signal-dropping transmission device determines whether or not the discard information is included in the signal to be dropped and, if the discard information is detected, discards the signal. This enables the transmission device to discard duplicate data, making it unnecessary to use a router or a filter. It is also possible to prevent traffic from increasing due to duplicate data as well as to reduce costs.

A first embodiment of the present invention will be now described in detail with reference to the drawings.

Figure 2:
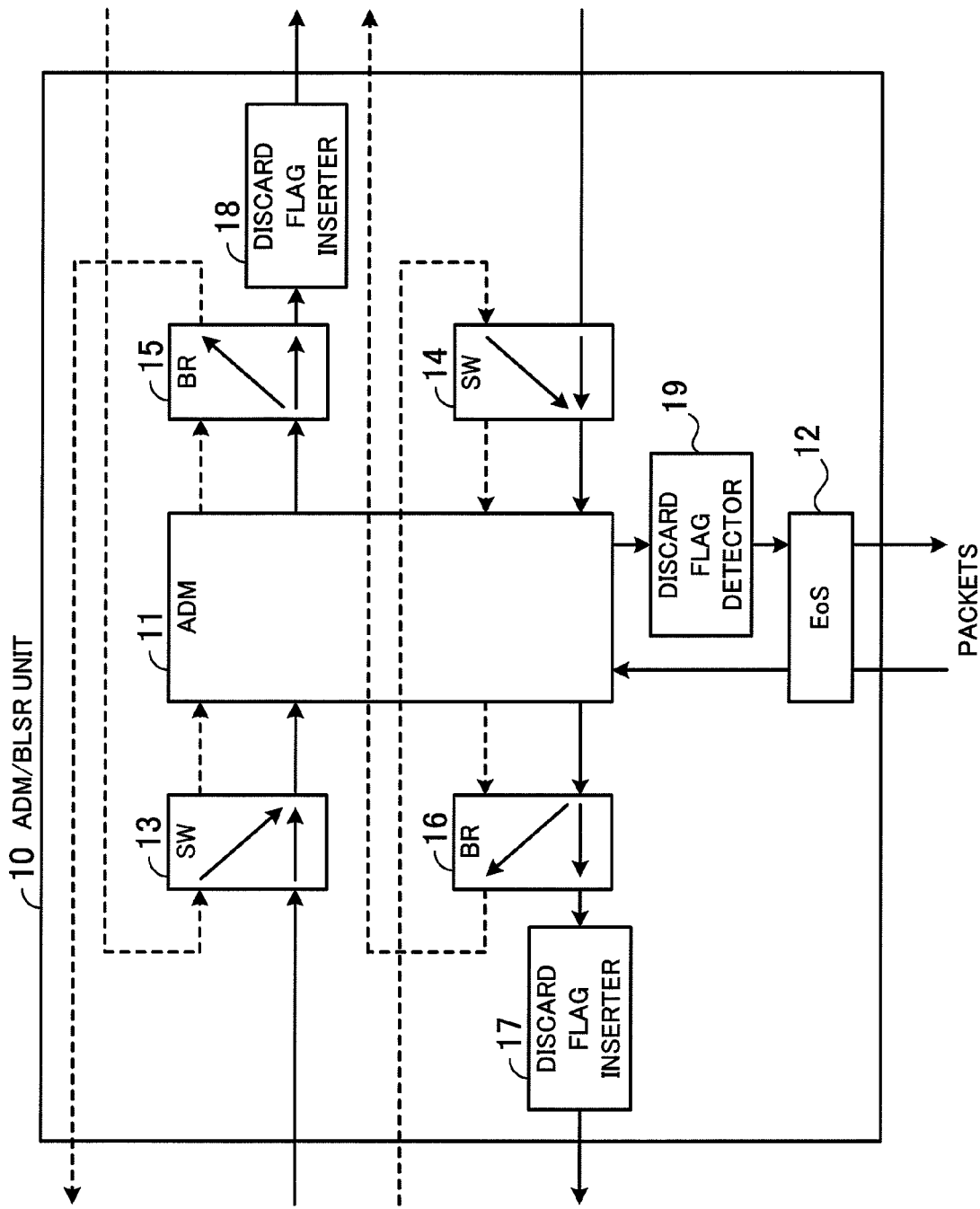
FIG. 2 is a block diagram of a transmission device according to a first embodiment.

FIG. 2 is a block diagram of a transmission device according to the first embodiment. As illustrated, the transmission device has an ADM/BLSR unit 10 capable of adding/dropping and cross-connecting signals and having a BLSR function. The ADM/BLSR unit 10 includes an ADM 11, an EoS 12, switches 13 and 14, bridges 15 and 16, discard flag inserters 17 and 18, and a discard flag detector 19.

The ADM 11 adds/drops and cross-connects signals path by path. The EoS 12 converts packets received from a lower-level network into ADD path frames. Also, the EoS converts DROP path frames output from the ADM 11 into Ethernet packets, which are then output to the lower-level network.

The switches 13 and 14 individually perform Work/Protection route switching, on a section-by-section basis, of signals to be input to the ADM 11. In response to an FS-R control signal, for example, the bridges 15 and 16 each distribute the signal output from the ADM 11 to the Work and Protection routes. In FIG. 2, the solid lines (except those extending downward from the ADM 11) represent the Work routes, and the dashed lines represent the Protection routes. The Work and Protection routes are switched by the switches 13 and 14 and the bridges 15 and 16, thus enabling the ring network to operate properly even in cases where the transmission paths fail.

Where FS-R bridging is executed by the bridge 16, for example, the discard flag inserter 17 inserts a flag (discard flag), which indicates that an identical signal (data) is being distributed to both the Work and Protection paths, into the POH (Path Over-Head) of the Work path signal output from the bridge 16. Similarly, where bridging is executed by the bridge 15, the discard flag inserter 18 inserts a flag, which indicates that identical data is being distributed to both the Work and Protection paths, into the POH of the Work path signal output from the bridge 15.

The discard flag detector 19 monitors the POH of the DROP path to detect the discard flag. If the discard flag is inserted in the POH, the discard flag detector discards the corresponding path frame, thereby preventing data (packets) from being output to the data drop side.

An exemplary configuration of a network using the transmission device of FIG. 2 will be now described with reference to FIG. 3. As illustrated, nodes 21 through 36 are connected in the form of a ring. Each of the nodes 21 to 36 has the same function as that of the transmission device shown in FIG. 2. In the figure, it is assumed that the nodes 21 and 36 are ADD and DROP nodes, respectively. The nodes 21 to 36 cooperatively provide Ethernet transmission by means of the Work path indicated by arrows 41. Redundancy switching of the nodes 21 to 36 is executed in conformity to Bellcore GR-1230.

Figure 3:
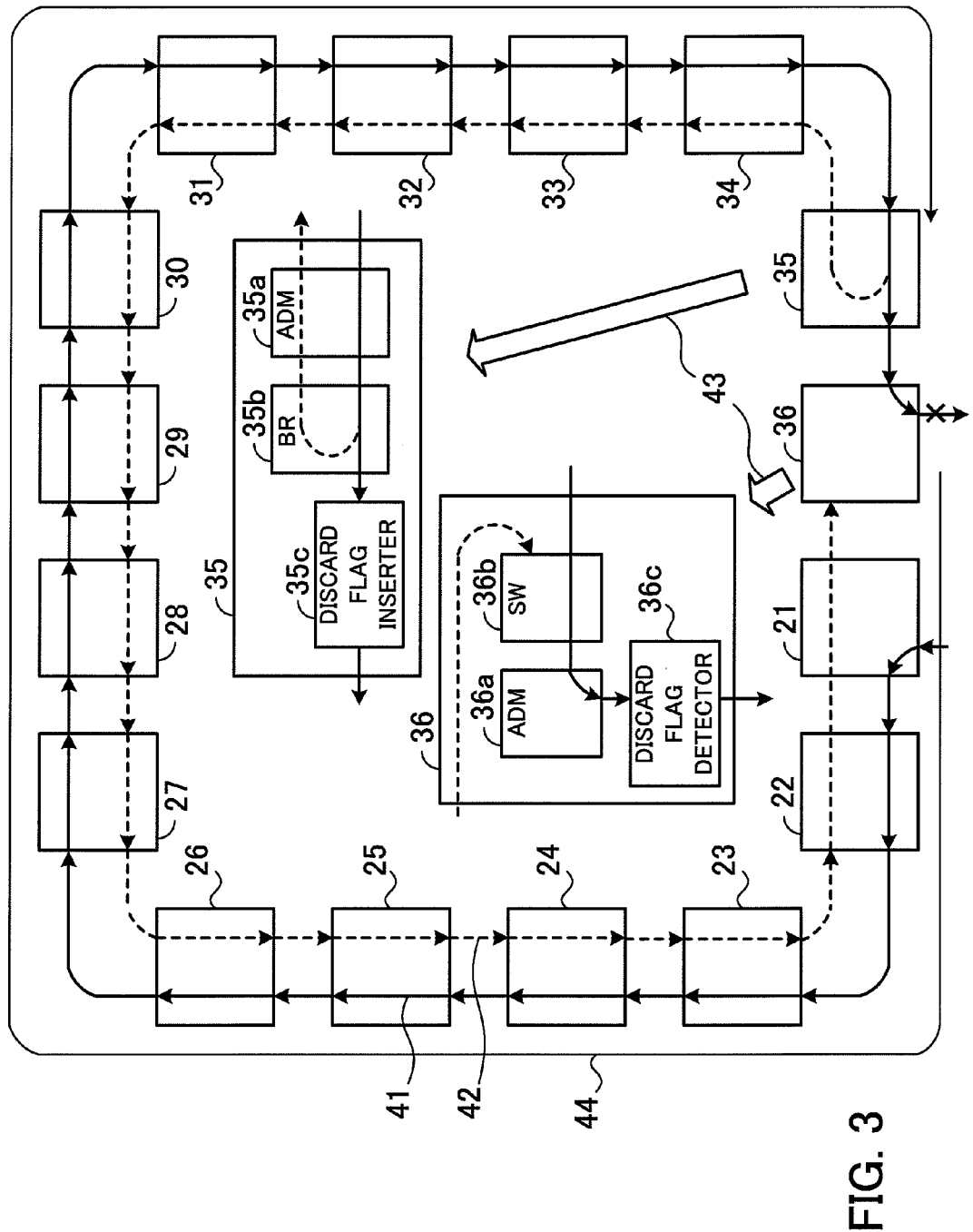
FIG. 3 shows an exemplary configuration of a network using the transmission device of FIG. 2.

FIG. 3 also shows parts of the nodes 35 and 36 in detail, as indicated by arrows 43. The node 35 includes an ADM 35a, a bridge 35b and a discard flag inserter 35c, which respectively correspond to the ADM 11, the bridge 16 and the discard flag inserter 17 shown in FIG. 2. The node 36 includes an ADM 36a, a switch 36b and a discard flag detector 36c, which respectively correspond to the ADM 11, the switch 14 and the discard flag detector 19 shown in FIG. 2.

Let us suppose that FS-R is executed in the span between the nodes 35 and 36. For example, the operator operates his/her terminal to cause the node 36 to output FS-R/IDLE as indicated by arrow 44.

In this case, the node 35 performs bridging in response to the FS-R request. Specifically, in the node 35, data is distributed by the bridge 35b so as to be transmitted via both of the Work path indicated by the arrows 41 and the Protection path indicated by arrows 42. Consequently, the same data arrives at the node 36 via the Work and Protection paths, as shown in FIG. 3. However, the POH of the Work path data output from the node 35 has the discard flag inserted therein by the discard flag inserter 35c.

At this stage, the node 36 is still selecting the Work path data by means of the switch 36b. Since the discard flag is inserted in the POH of the Work path, the discard flag detector 36c of the node 36 discards the DROP path data. Accordingly, the packets are not output from the node 36 to the data drop side.

Following the bridging of the node 35, the node 36 is switched in the manner described below.

Figure 4:
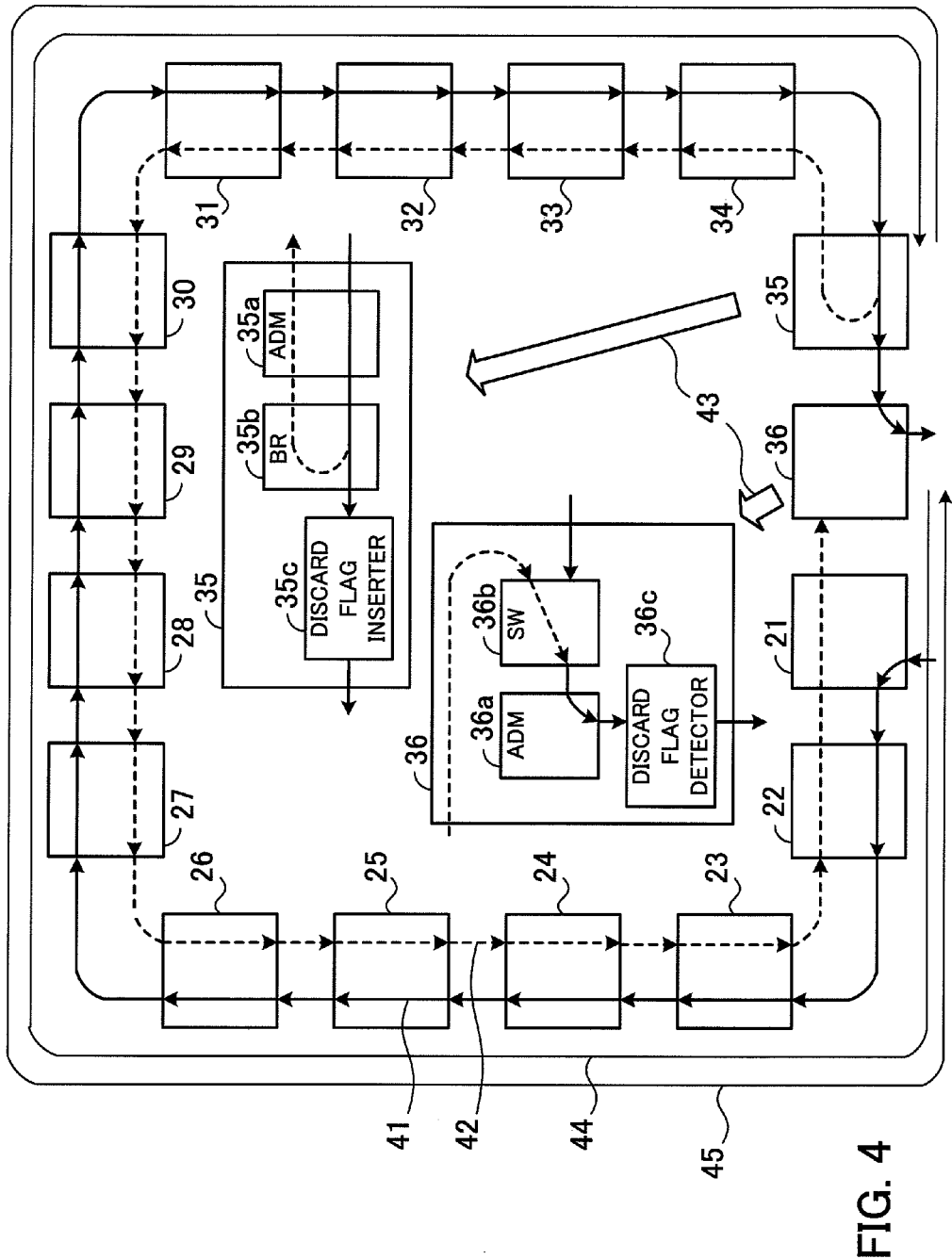
FIG. 4 shows the network after switching.

FIG. 4 illustrates the network after the switching. In FIG. 4, like reference numerals are used to denote like elements appearing in FIG. 3, and description of such elements is omitted.

After executing the bridging, the node 35 transmits information indicative of completion of bridging (FS-R/Br) to the node 36, as indicated by arrow 45. On receiving the information, the node 36 operates the switch 36b so that the DROP path of the ADM 36a may be switched from the Work path to the Protection path.

No discard flag is inserted in the POH of Protection path frames, and therefore, the Protection path data is not discarded by the discard flag detector 36c. Namely, the node 36 outputs the Protection path frame data as packets to the lower-level network.

In this manner, where bridging is started, the discard flag is inserted into the POH of the Work path frames. The data-dropping node monitors the POH, and if a discard flag is inserted in the POH, the node discards the corresponding path frame. It is therefore possible to prevent duplicate packets from being output after the start of bridging due to a delay skew between the Work and Protection paths.

Instead of inserting the discard flag into the POH, a method may be employed in which the Work path is brought to an anomalous state. For example, when bridging is started, the payload of the Work path is set to a state other a normal state, such as PAIS (Path Alarm Indication Signal)/UNEQ (Unequipped), thereby preventing duplicate packets from being output to the data drop side. Specifically, the discard flag inserters 17 and 18 shown in FIG. 2 are each replaced by a PAIS/UNEQ unit. When bridging is started, the PAIS/UNEQ unit sets the Work path frame to an anomalous state. When the PAIS/UNEQ frame is received, the ADM of the data-dropping node discards the frame.

Alternatively, a method of inserting control data into the payload of a path frame may be used. For example, when bridging is started, control data is inserted into the payload of the Work path. Specifically, the discard flag inserters 17 and 18 shown in FIG. 2 are each replaced by a control data inserter, and the discard flag detector 19 is replaced by a control data detector. When bridging is initiated, the control data inserter inserts discard control information into the payload of the Work path. At the data-dropping node, if the discard control information is included in the payload received via the Work path, the control data detector discards the frame.

A second embodiment of the present invention will be now described in detail with reference to the drawings. A transmission device according to the second embodiment is an STM64 (Synchronous Transport Module-64) constituting a BLSR ring and having FastEthernet-based ADD/DROP ports.

Figure 5:
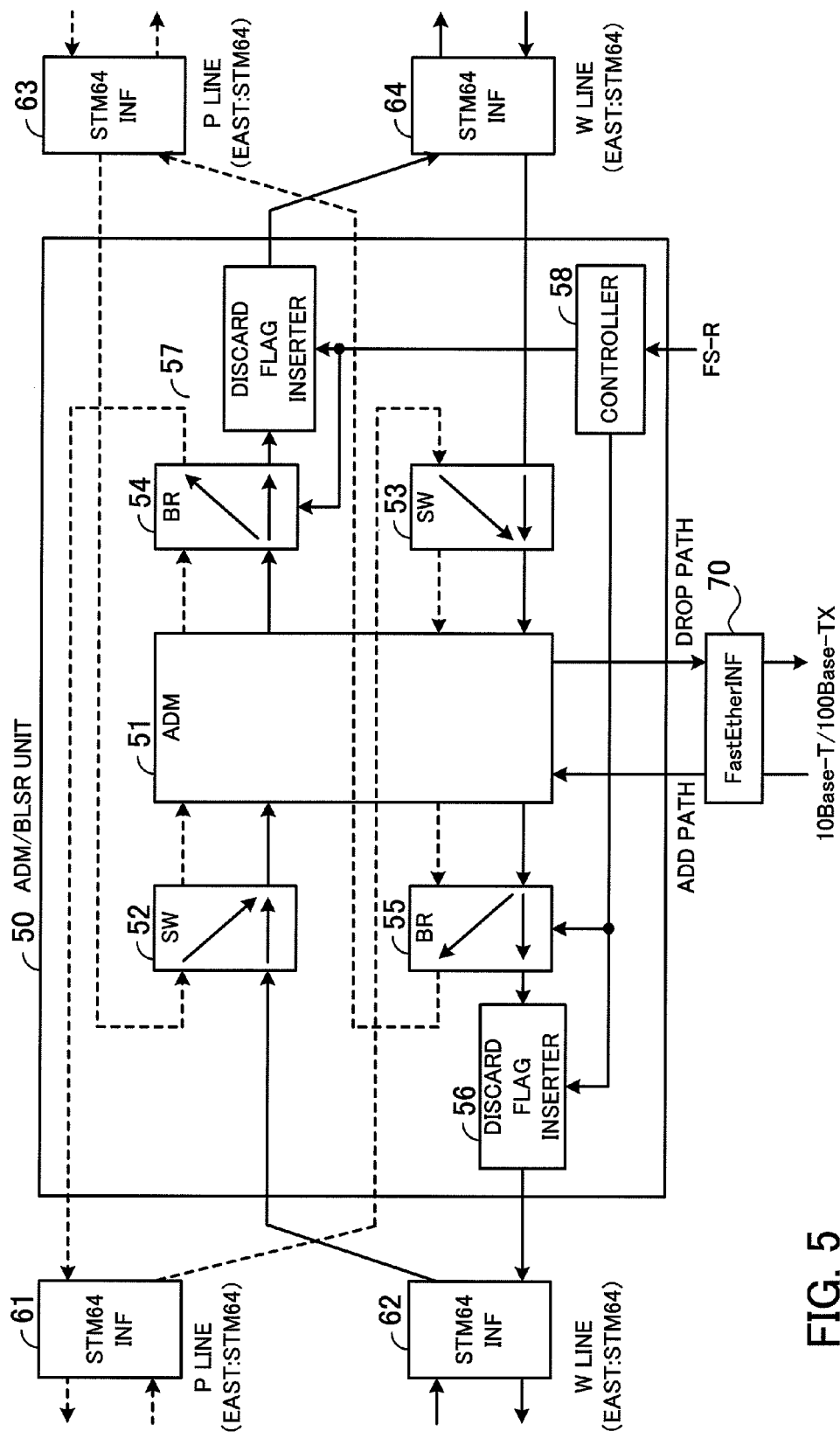
FIG. 5 is a block diagram of a transmission device according to a second embodiment.

FIG. 5 is a block diagram of the transmission device of the second embodiment. As illustrated, the transmission device has an ADM/BLSR unit 50, STM64 interfaces (INF) 61 to 64, and a FastEthernet interface 70.

The ADM/BLSR unit 50 includes an ADM 51, switches 52 and 53, bridges 54 and 55, discard flag inserters 56 and 57, and a controller 58. The ADM 51, switches 52 and 53, bridges 54 and 55 and discard flag inserters 56 and 57 of the ADM/BLSR unit 50 are respectively identical with the ADM 11, switches 13 and 14, bridges 15 and 16 and discard flag inserters 17 and 18 of the ADM/BLSR unit 10 explained above with reference to FIG. 2; therefore, detailed description of these elements is omitted. However, the discard flag inserters 56 and 57 are each adapted to insert the discard flag in the N1 byte of the POH. The N1 byte is unused, and therefore, by inserting the discard flag into the N1 byte, it is possible to prevent data duplication from being caused in existing infrastructures when the Work and Protection paths are switched.

The controller 58 controls the bridge 54, 55 so that when FS-R is received, data may be distributed to both the Work and Protection paths. Also, on receiving FS-R, the controller 58 causes the discard flag inserter 56, 57 to insert the discard flag into the POH of data. The STM64 interfaces 61 to 64 are STM64 interface units for transmitting and receiving optical or electrical signals.

The FastEthernet interface 70 converts 10 Base-T or 100 Base-TX packets to VC3 or VC4 ADD path data, which is then output to the ADM 51. Also, the FastEthernet interface converts VC3 or VC4 DROP path data output from the ADM 51 to 10 Base-T or 100 Base-TX packets, which are output to a lower-level network. If a discard flag is included in the POH of the DROP path, the FastEthernet interface 70 discards the corresponding frame.

Figure 6:
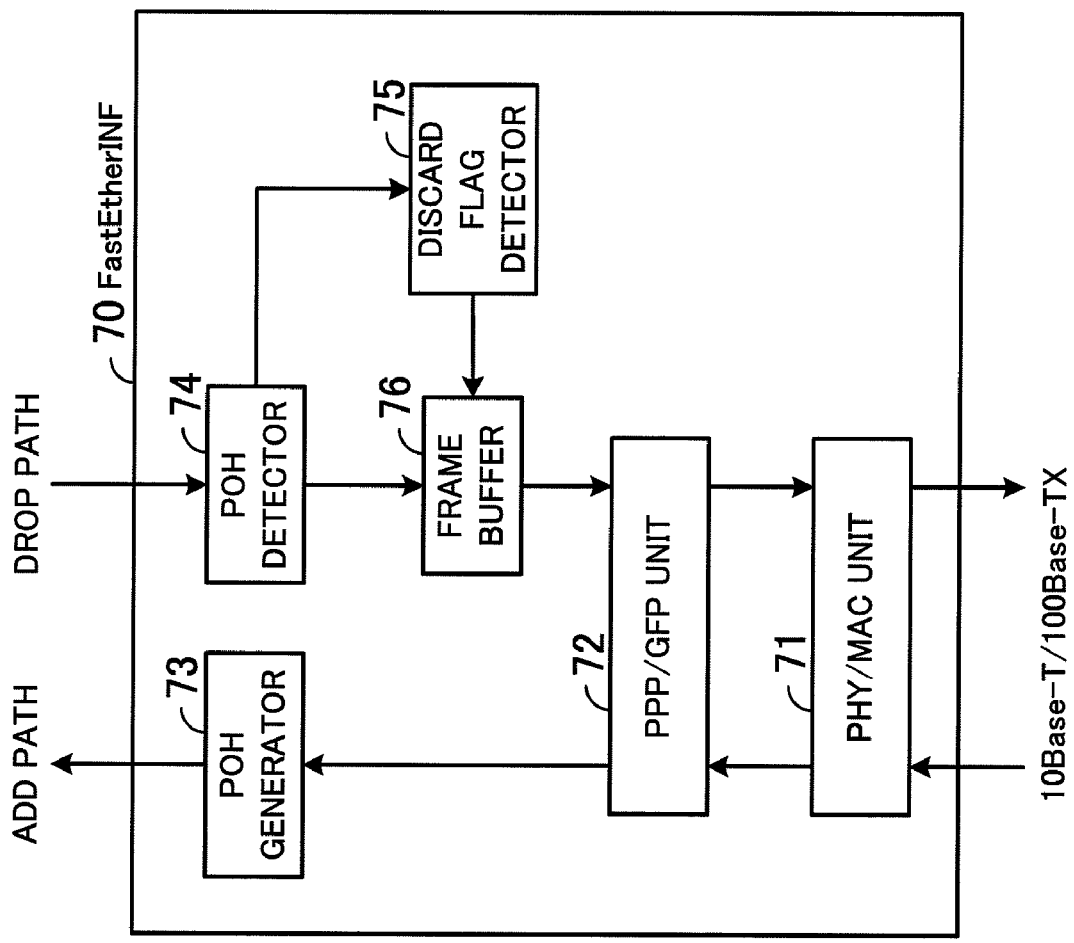
FIG. 6 shows a FastEthernet interface in detail.

FIG. 6 shows details of the FastEthernet interface. As illustrated, the FastEthernet interface 70 includes a PHY (physical layer)/MAC (Media Access Control) unit 71, a PPP (Point-to-Point Protocol)/GFP (Generic Framing Procedure) unit 72, a POH generator 73, a POH detector 74, a discard flag detector 75, and a frame buffer 76.

The PHY/MAC unit 71 terminates the Ethernet ports. Also, the PHY/MAC unit 71 outputs packets demapped by the PPP/GFP unit 72 to the Ethernet ports.

The PPP/GFP unit 72 functions as a PPP/GFP framer. The PPP/GFP unit 72 maps packets into an SDH path PPP/GFP stream (payload) and also demaps SDH path payload data into packets. The POH generator 73 generates a POH, then affixes the POH to the payload, and outputs the resulting data to the ADM/BLSR unit 50.

The POH detector 74 detects the POH of the path frame output from the ADM/BLSR unit 50, and then outputs the N1 byte of the POH to the discard flag detector 75. The frame buffer 76 temporarily stores the path frame output from the POH detector 74. Where a discard flag is inserted in the N1 byte output from the POH detector 74, the discard flag detector 75 discards the corresponding path frame stored in the frame buffer 76.

The discard flag inserter 56 appearing in FIG. 5 will be now described in detail.

Figure 7:
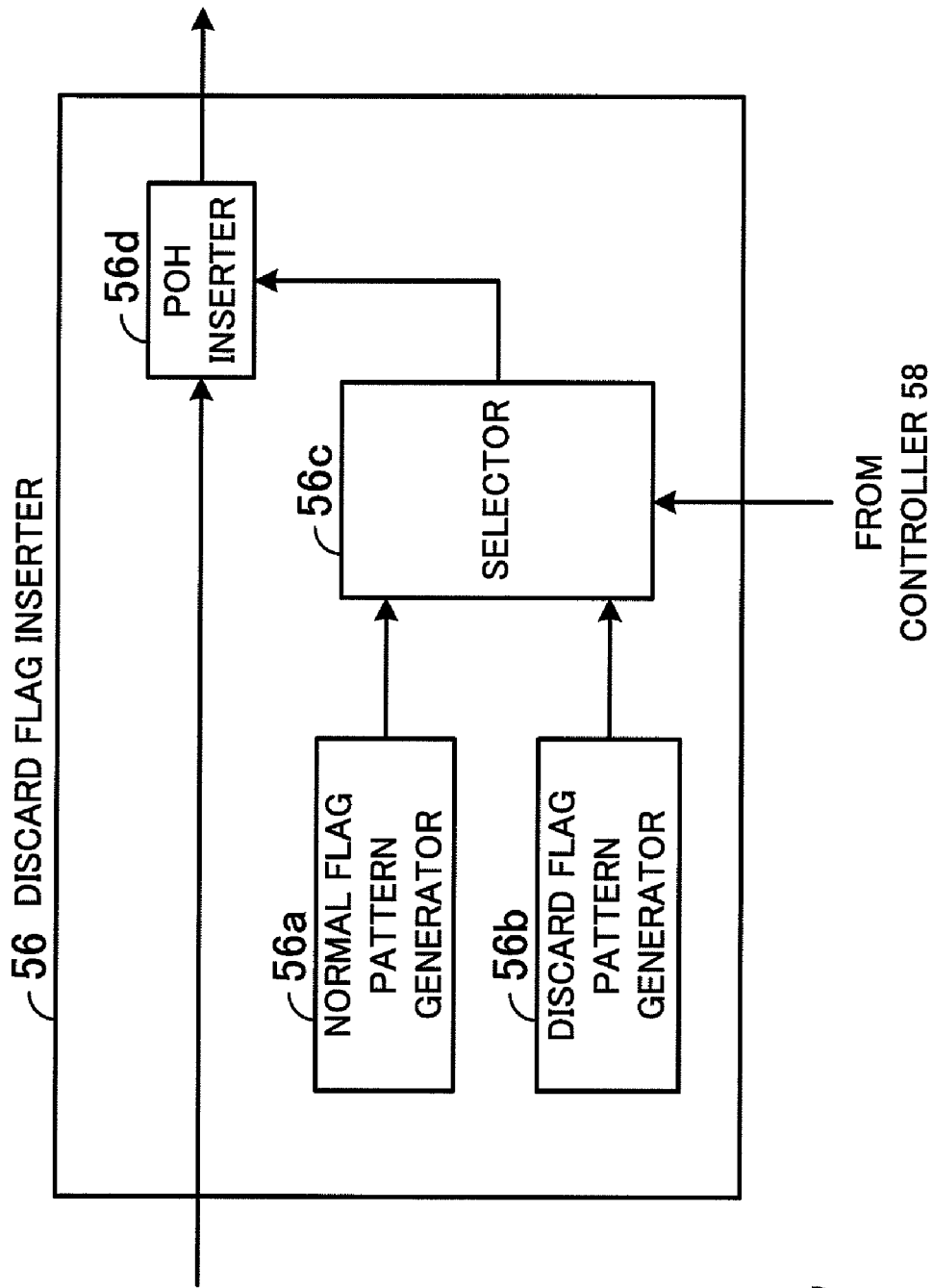
FIG. 7 shows a discard flag inserter in detail.

FIG. 7 shows the discard flag inserter in detail. As illustrated, the discard flag inserter 56 includes a normal flag pattern generator 56*a*, a discard flag pattern generator 56*b*, a selector 56*c*, and a POH inserter 56*d*.

The normal flag pattern generator 56*a* generates a flag pattern indicating that the SDH path is normal. The discard flag pattern generator 56*b* generates a flag pattern indicating that the SDH path data should be discarded. The normal flag pattern is 10100101, for example, and the discard flag pattern is derived by inverting the normal flag pattern and thus 01011010, in order to prevent malfunction from being caused when bit error occurs.

The selector 56*c*, which operates under the control of the controller 58, outputs the flag pattern generated by either the normal flag pattern generator 56*a* or the discard flag pattern generator 56*b* to the POH inserter 56*d*. During normal operation, the controller 58 controls the selector 56*c* so as to output the normal flag pattern. When an FS-R control signal, for example, is received, the controller controls the selector 56*c* so as to output the discard flag pattern.

The POH inserter 56*d* inserts the flag pattern output from the selector 56*c* into the N1 byte of the POH.

The discard flag inserter 57 also has the same configuration as illustrated in FIG. 7.

Figure 8:
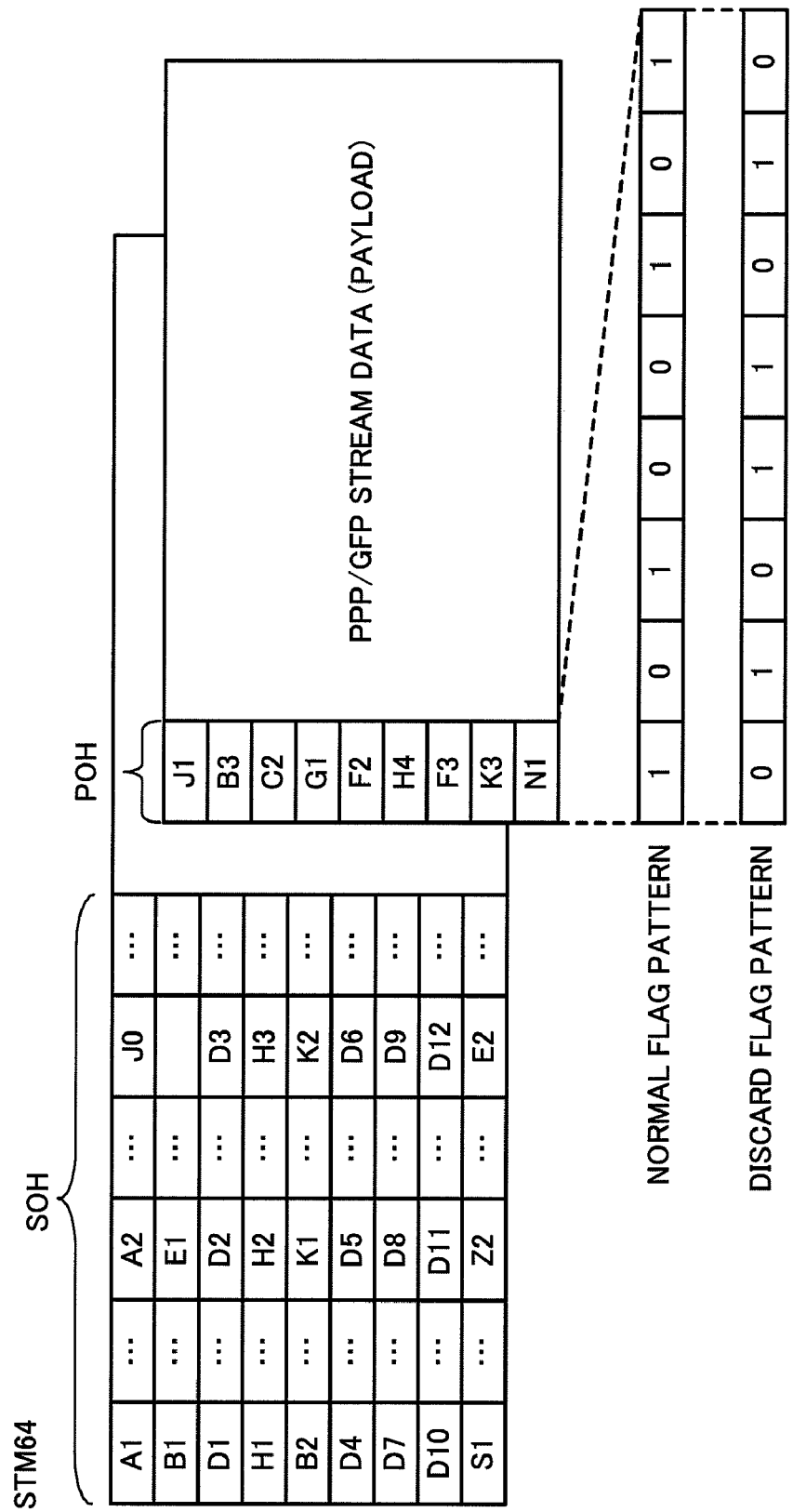
FIG. 8 illustrates flag patterns.

FIG. 8 illustrates the flag patterns. The figure shows an STM64 frame and its SOH (Section Over-Head), as well as a POH and PPP/GFP stream data stored in the payload of the STM64 frame. As illustrated, the normal flag pattern and the discard flag pattern are each inserted into the N1 byte of the POH.

Figure 9:
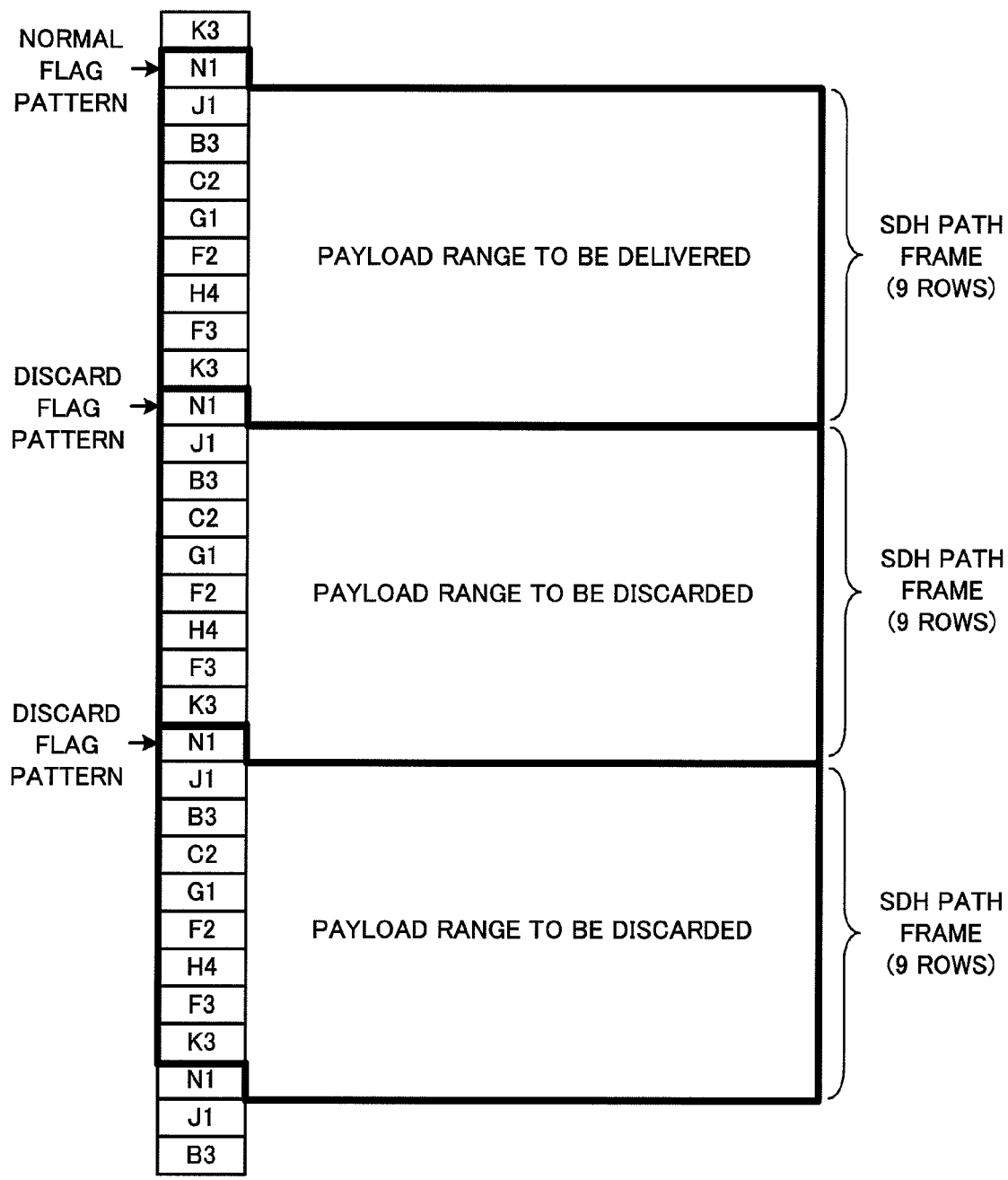
FIG. 9 illustrates the ranges of frames to be discarded.

FIG. 9 illustrates the ranges of frames to be discarded. The figure shows SDH path frames temporarily stored in the frame buffer 76 explained above with reference to FIG. 6. Among the N1 bytes shown in the figure, the top N1 byte shows the normal flag pattern while the following two N1 bytes each show the discard flag pattern, as illustrated.

On detecting the discard flag pattern inserted in the N1 byte, the discard flag detector 75 shown in FIG. 6 discards the corresponding path frame stored in the frame buffer 76. At this time, the discard flag detector 75 discards the path frame succeeding the N1 byte with the discard flag pattern in its entirety from the beginning of the path frame to the end of the payload, as illustrated in FIG. 9.

In this manner, of the duplicate data arriving via the Work and Protection paths during the bridging of BLSR, the Work path data is discarded by the data-dropping node, whereby duplication of DROP data can be prevented.

While the discard flag detector 75 determines whether to discard the path frame, the received path frame needs to be temporarily retained. It is therefore necessary that the frame buffer 76 should have a capacity large enough to store one or more frames.

A third embodiment of the present invention will be now described in detail with reference to the drawings. In the first and second embodiments, the discard flag is inserted into the POH to avoid duplication of DROP data. According to the third embodiment, a sequential number is inserted into the POH and the data-dropping node checks the sequential number for continuity, to avoid duplication of DROP data.

Figure 10:
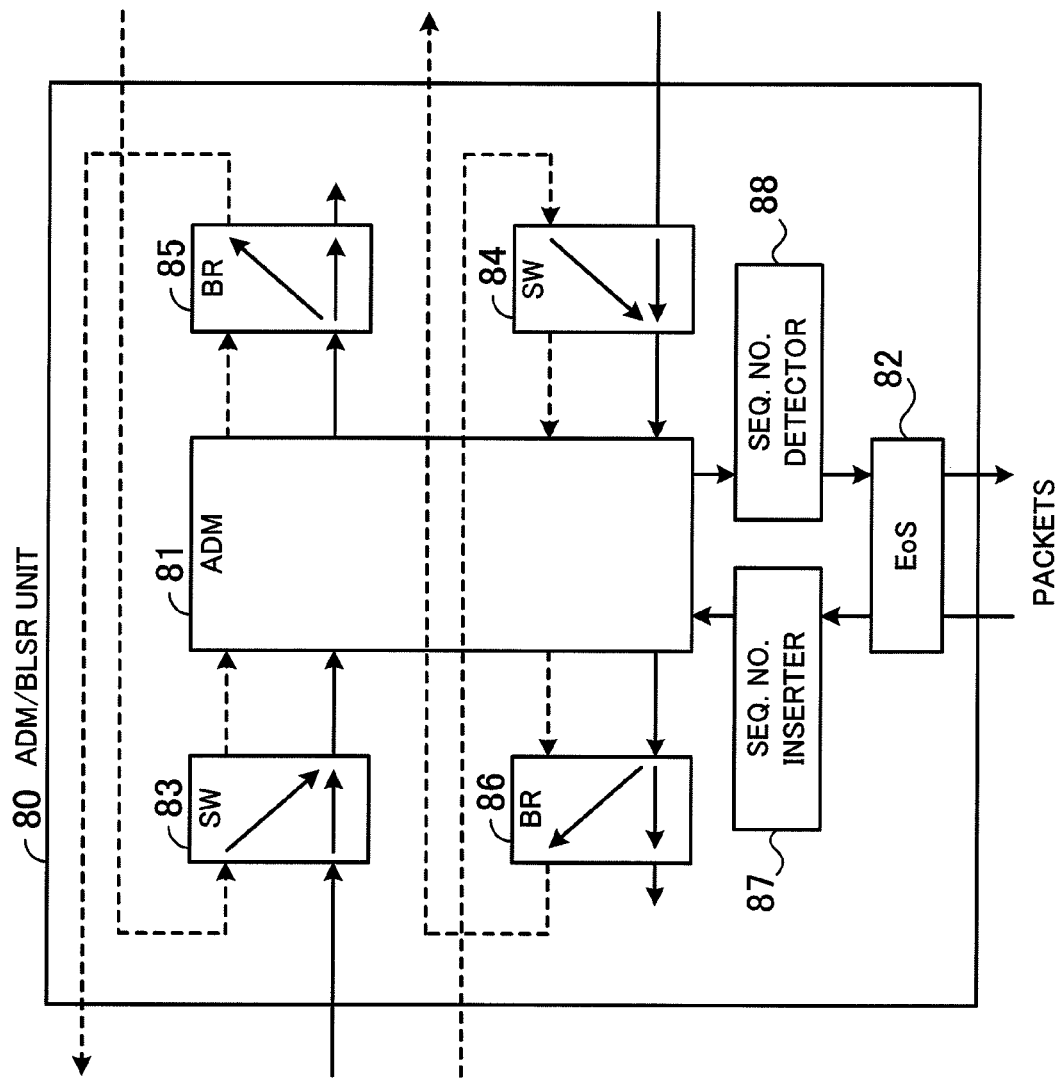
FIG. 10 is a block diagram of a transmission device according to a third embodiment.

FIG. 10 is a block diagram of a transmission device according to the third embodiment. As illustrated, the transmission device has an ADM/BLSR unit 80 capable of adding/dropping and cross-connecting data and having a BLSR function. The ADM/BLSR unit 80 includes an ADM 81, an EoS 82, switches 83 and 84, bridges 85 and 86, a sequential number inserter 87, and a sequential number detector 88. The ADM 81, the EoS 82, the switches 83 and 84 and the bridges 85 and 86 are respectively identical with the ADM 11, the EoS 12, the switches 13 and 14 and the bridges 15 and 16 explained above with reference to FIG. 2; therefore, detailed description of these elements is omitted.

The sequential number inserter 87 inserts a sequential number, which is incremented by "1" at a time, for example, into the POH of the ADD path to indicate continuity of ADD path frames.

The sequential number detector 88 detects the sequential number inserted in the POH of the DROP path and determines whether or not the detected sequential number shows continuity. The sequential number detector 88 discards a DROP path frame with a continuity-lacking sequential number so that the data (packet) may not be output to the lower-level network. Let it be assumed, for example, that frames up to the sequential number "7" have been received. In this case, the sequential number detector 88 discards DROP path frames with sequential numbers other than "8", and passes the DROP path frame with the sequential number "8".

An exemplary configuration of a network using the transmission device of FIG. 10 will be now described with reference to FIG. 11. As illustrated, nodes 91 through 106 are connected in the form of a ring. Each of the nodes 91 to 106 has the same function as that of the transmission device shown in FIG. 10. In the figure, the nodes 91 and 106 are ADD and DROP nodes, respectively. The nodes 91 through 106 cooperatively provide Ethernet transmission by means of the Work path indicated by arrows 111. Redundancy switching of the nodes 91 to 106 is executed in conformity to Bellcore GR-1230.

Figure 11:
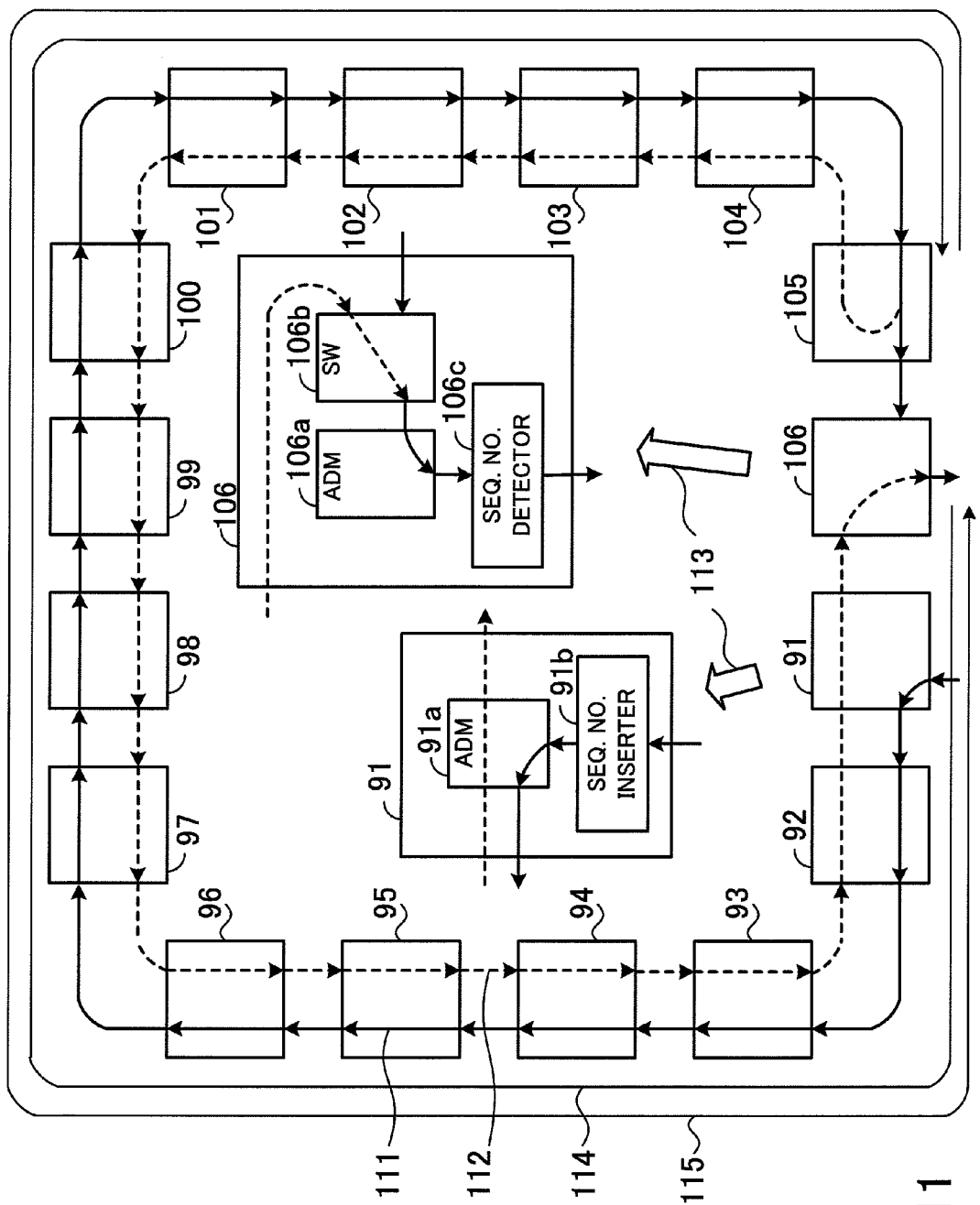
FIG. 11 shows an exemplary configuration of a network using the transmission device of FIG. 10.

FIG. 11 also shows parts of the nodes 91 and 106 in detail, as indicated by arrows 113. The node 91 includes an ADM 91a and a sequential number inserter 91b, which respectively correspond to the ADM 81 and the sequential number inserter 87 shown in FIG. 10. The node 106 includes an ADM 106a, a switch 106b and a sequential number detector 106c, which respectively correspond to the ADM 81, the switch 84 and the sequential number detector 88 shown in FIG. 10.

Let us suppose that FS-R is executed in the span between the nodes 105 and 106. For example, the operator operates his/her terminal to cause the node 106 to output FS-R/IDLE as indicated by arrow 114. In this case, the node 105 performs bridging in response to the FS-R request.

After executing the bridging, the node 105 transmits information indicative of completion of bridging (FS-R/Br) to the node 106, as indicated by arrow 115. On receiving the information, the node 106 operates the switch 106b so that the DROP path may be switched from the Work path to the Protection path. As a result, the node 106 receives duplicate data, that is, the Work path data which was transmitted before the switching of the switch 106b and the Protection path data transmitted after the switching of the switch 106b.

The POHs of the Work and Protection path data arriving at the node 106 have the sequential numbers inserted therein by the sequential number inserter 91b. Accordingly, the Protection path data received immediately after the switching of the switch 106b includes the same sequential numbers as those which have already been received via the Work path. Namely, after receiving the Work path data, the node 106 receives the delayed, duplicate frames with the same sequential numbers via the Protection path. The data-dropping node 106 therefore discards the received Protection path frames until it receives a path frame with the next sequential number following the number already sent to the lower-level network. When the Protection path frame with the next sequential number is received, the node 106 sends the received Protection path frame to the lower-level network.

Figure 12A:
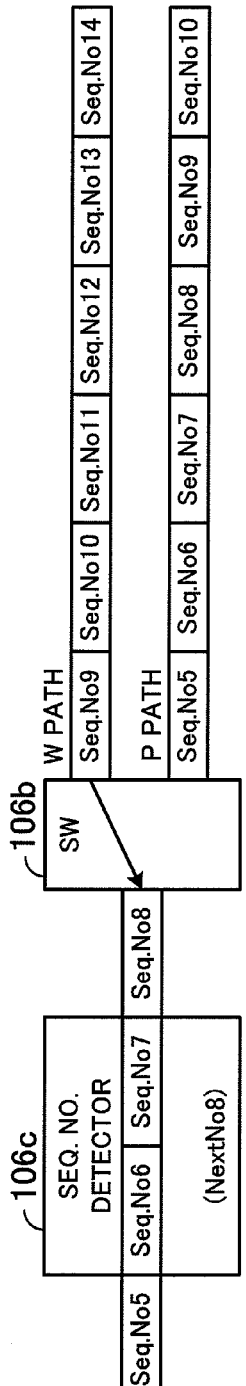
FIGS. 12A, 12B, 12C and 12D illustrate path frames flowing to a node.

Path frames flowing to the node 106 will be now described with reference to FIGS. 12A, 12B, 12C and 12D. The figures show the switch 106b and sequential number detector 106c of the node 106 appearing in FIG. 11, along with the sequential numbers (in the figures, Seq. No. x, where x is a positive integer) of Work and Protection path frames input to the switch 106b.

Where FS-R is not yet transmitted to the node 105, the switch 106b of the node 106 outputs the Work path frames received from the node 105 to the sequential number detector 106c, as shown in FIG. 12A. As illustrated, a path frame with the sequential number "7" has just been input to the sequential number detector 106c, and thus, the sequential number detector 106c recognizes that the sequential number of the path frame to be input next is "8".

Figure 12B:
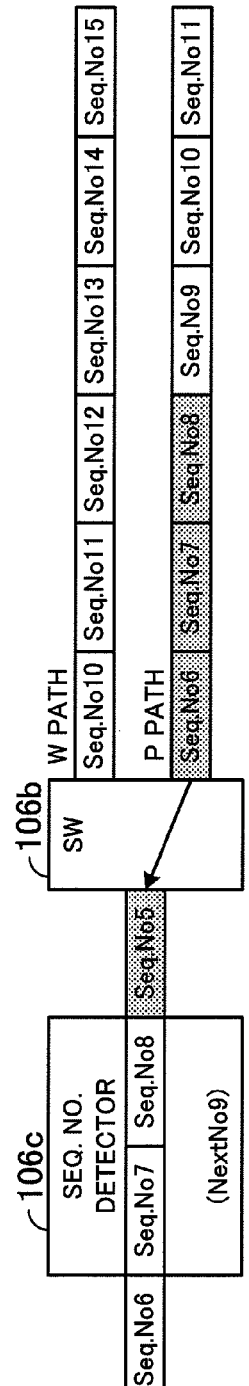

Let us suppose that FS-R is transmitted to the node 105 and that the node 106 receives from the node 105 information indicative of completion of bridging. In this case, the switch 106b switches the path from the Work path to the Protection path, as shown in FIG. 12B. The Protection path frame received at this time has a sequential number of, for example, "5" which has already been received because of a delay skew between the transmission paths. The sequential number detector 106c has received up to the frame with the sequential number "8" until then and recognizes that the sequential number of the path frame to be received next is "9".

Since the path has been switched to the Protection path by the switch 106b, the sequential number detector 106c is again input with the path (Protection path) frame with the sequential number "5" which was received in the past. However, the sequential number to be received next is "9", and therefore, the sequential number detector 106c discards the Protection path frame with the sequential number "5".

Figure 12C:
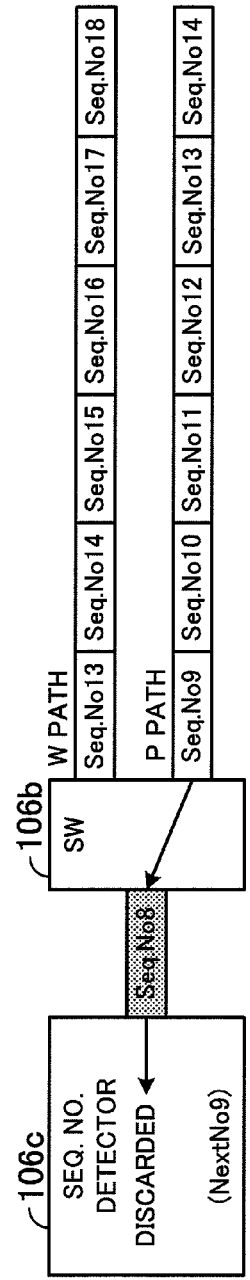
Figure 12D:
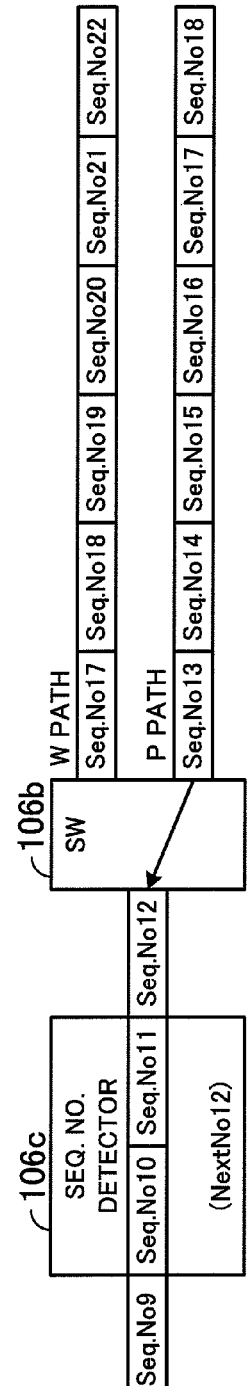

The sequential number detector 106c discards subsequent path frames one after another up to the frame with the sequential number "8", as shown in FIG. 12C. The path frames with the sequential number "9" and the following numbers output thereafter from the switch 106b are not discarded but are delivered, as shown in FIG. 12D.

In this manner, sequential numbers are inserted into the POHs of frames. This allows the data-dropping node to monitor continuity of the sequential numbers and to discard continuity-lacking path frames, whereby duplicate packets can be prevented from being output during the bridging of BLSR.

Also, since the sequential numbers are inserted into the POHs of path frames and are monitored independently of the bridge or the switch, it is possible to avoid packet duplication not only in BLSR networks but also in UPSR ring networks, as distinct from the first and second embodiments.

A fourth embodiment of the present invention will be now described in detail with reference to the drawings. A transmission device according to the fourth embodiment is an STM64 constituting a BLSR ring and having FastEthernet-based ADD/DROP ports.

Figure 13:
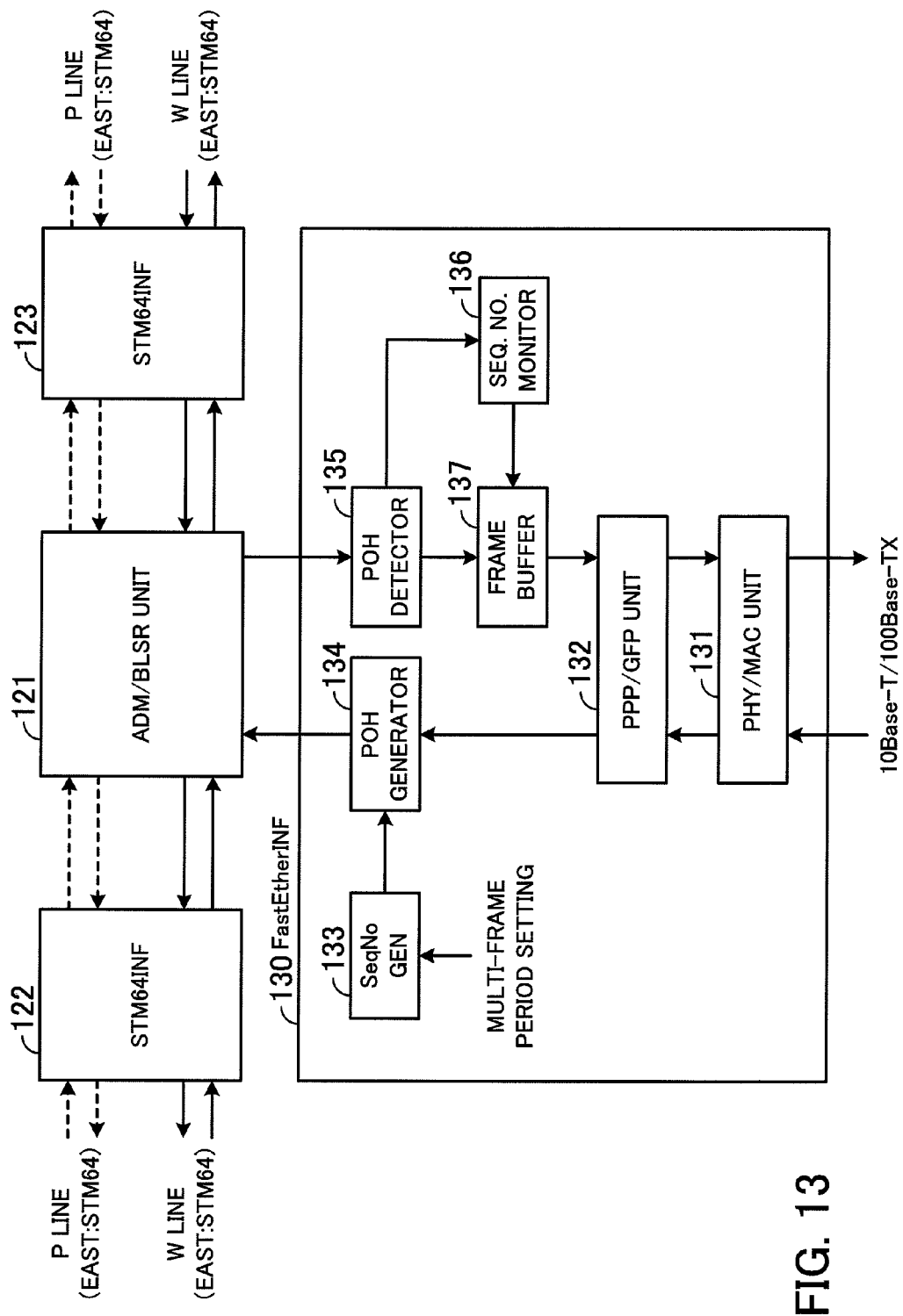
FIG. 13 is a block diagram of a transmission device according to a fourth embodiment.

FIG. 13 is a block diagram of the transmission device of the fourth embodiment. As illustrated, the transmission device has an ADM/BLSR unit 121, STM64 interfaces 122 and 123, and a FastEthernet interface 130.

Figure 17:
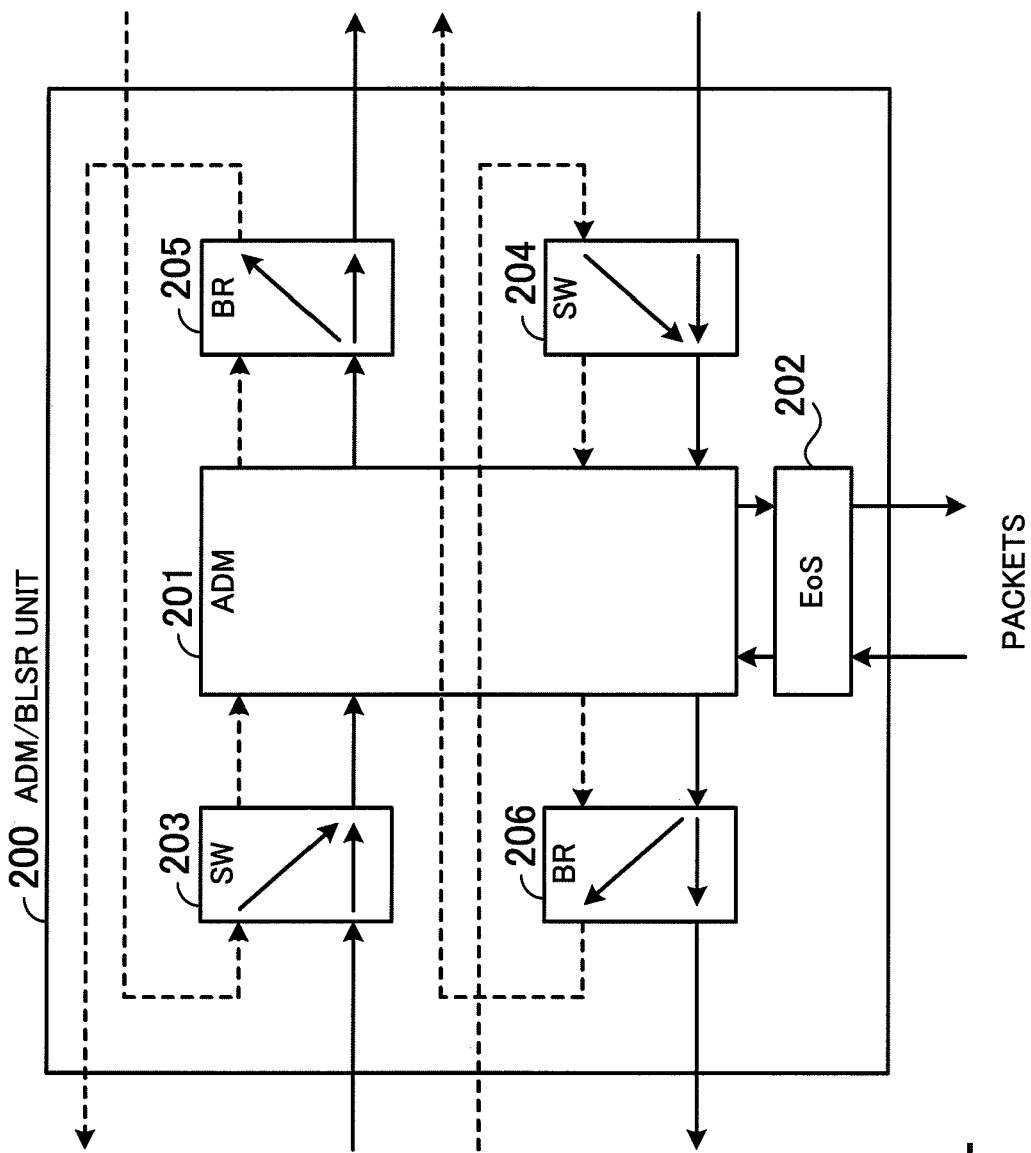
FIG. 17 is a block diagram of a conventional transmission device configured according to BLSR.
Figure 18:
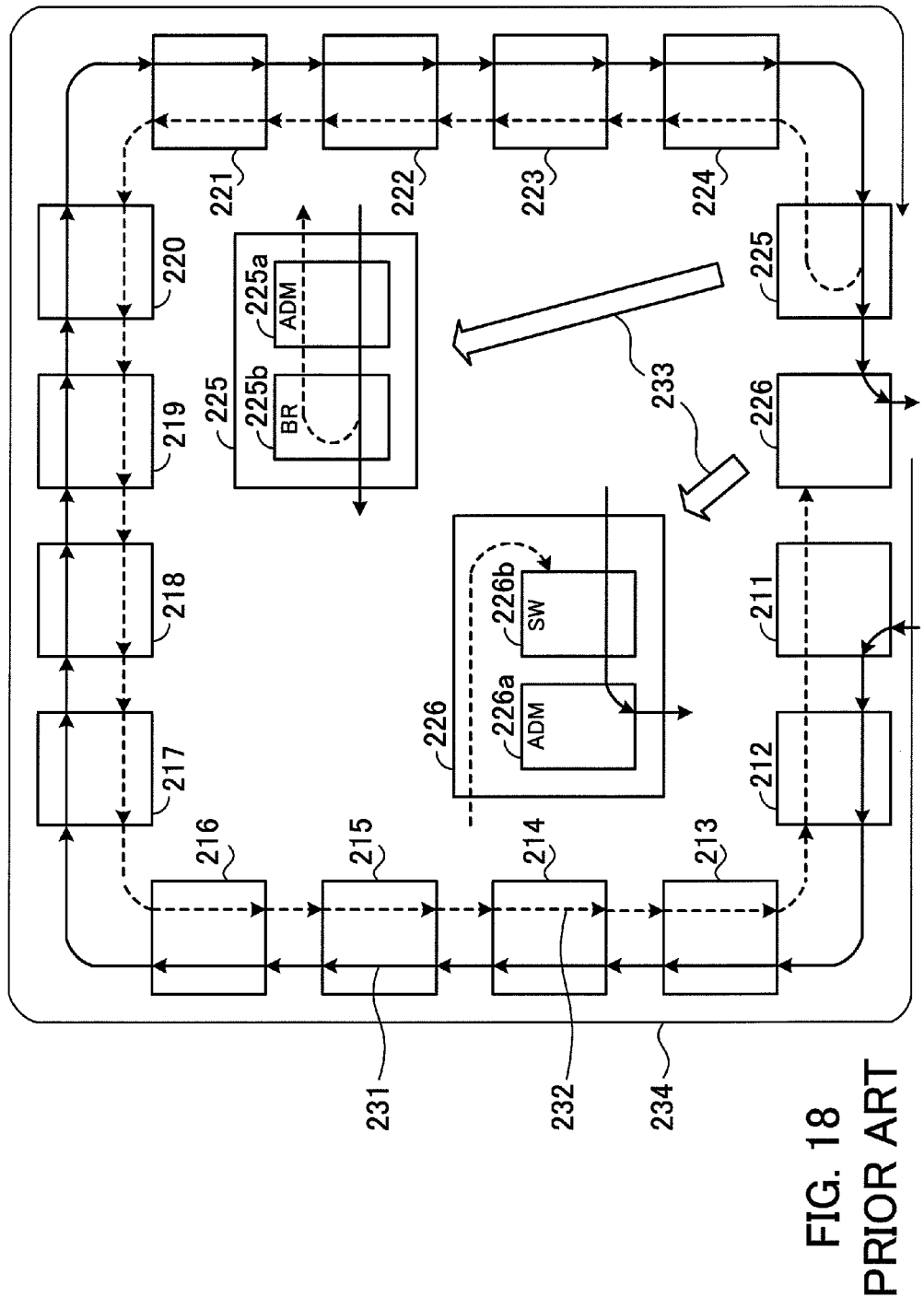
FIG. 18 shows an exemplary configuration of a BLSR network using the conventional transmission devices.
Figure 19:
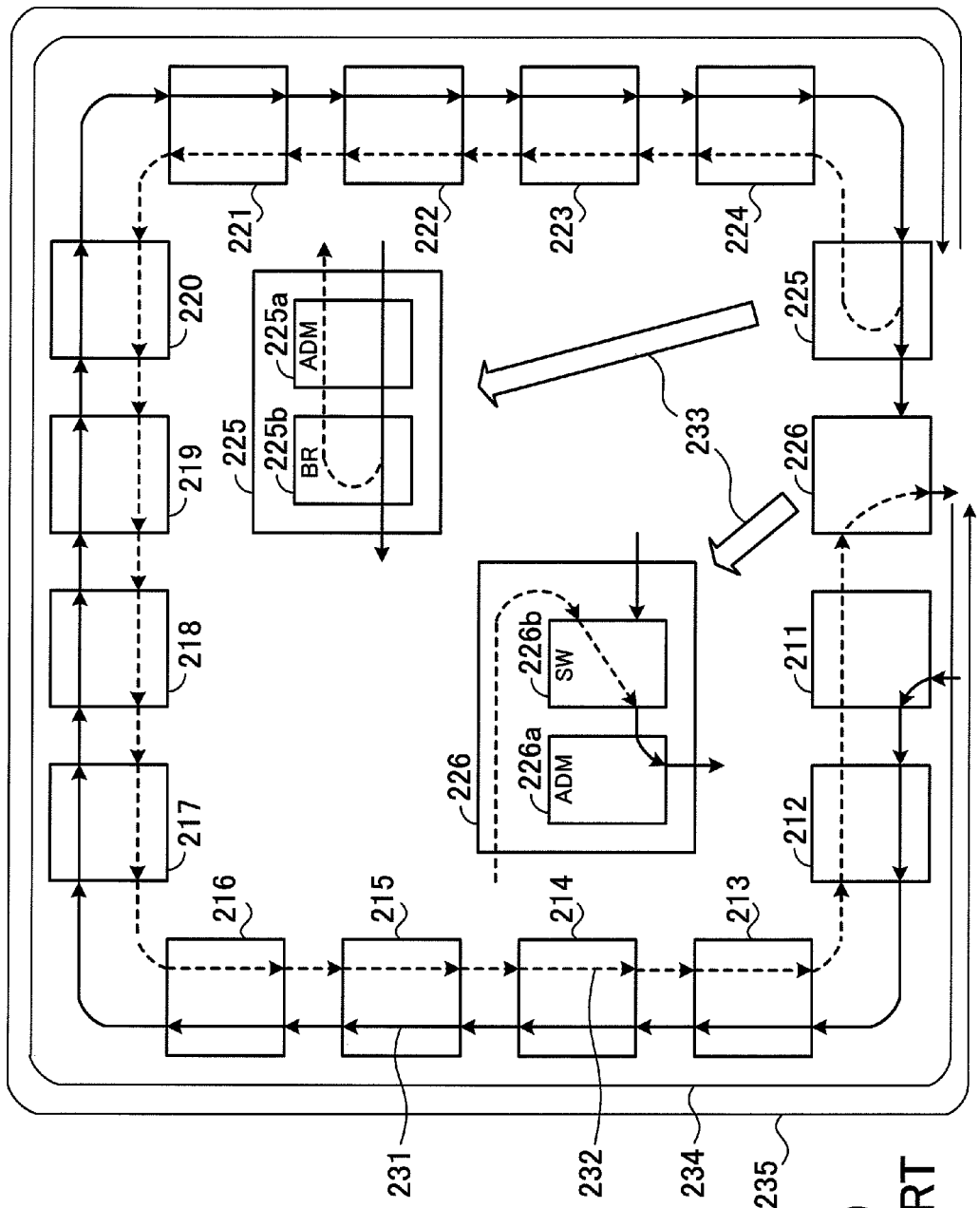
FIG. 19 shows the network after switching.

The ADM/BLSR unit 121 is capable of adding/dropping and cross-connecting data and also has a BLSR function. The ADM/BLSR unit 121 includes, for example, an ADM, switches, and bridges similar to those shown in FIG. 17. The STM64 interfaces 122 and 123 are STM64 interface units for transmitting and receiving optical or electrical signals.

The FastEthernet interface 130 includes a PHY/MAC unit 131, a PPP/GFP unit 132, a sequential number generator 133, a POH generator 134, a POH detector 135, a sequential number monitor 136, and a frame buffer 137. The PHY/MAC unit 131, the PPP/GFP unit 132, the POH generator 134, the POH detector 135 and the frame buffer 137 are respectively identical with the PHY/MAC unit 71, PPP/GFP unit 72, POH generator 73, POH detector 74 and frame buffer 76 explained above with reference to FIG. 6; therefore, detailed description of these elements is omitted.

The sequential number generator 133 inserts a sequential number, which is incremented sequentially for every generated path frame, into the N1 byte in the POH of the ADD path. Also, the sequential number generator 133 resets the sequential number with a set multi-frame period. Where one multi-frame consists of 63 frames, for example, the sequential number generator 133 successively increments the sequential number from "1" for every generated path frame and resets the sequential number to "1" when "63" is reached.

The sequential number monitor 136 monitors continuity of the sequential number in the N1 byte detected by the POH detector 135. Also, the sequential number monitor 136 discards a path frame with a continuity-lacking sequential number stored in the frame buffer 137.

The sequential number monitor 136 and the sequential number generator 133 have the same multi-frame period set therein. Accordingly, after continuity of 63 path frames, for example, is monitored, the sequential number monitor 136 recognizes that the sequential number of the frame to be received next is "1". In this instance, one multi-frame is made up of 63 frames; however, the number of frames constituting one multi-frame is of course not limited to 63.

Figure 14:
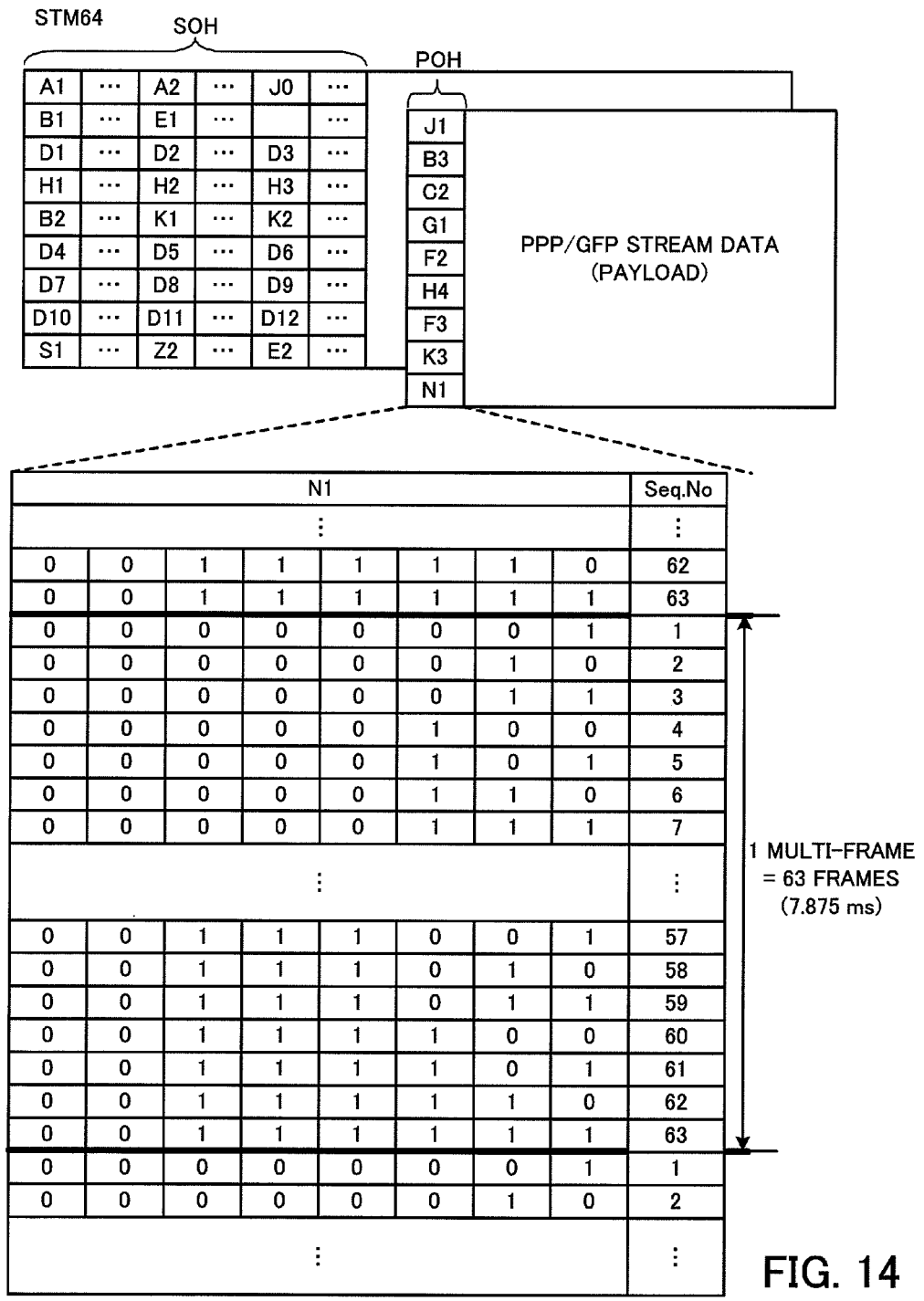
FIG. 14 illustrates sequential numbers mapped into POHs.

The manner of how the sequential number is mapped into the N1 byte in the POH will be now explained with reference to FIG. 14. As illustrated, the sequential number generator 133 inserts, into the N1 byte in the POH, a sequential number that is incremented by "1" for every generated path frame.

The sequential number is reset with the set multi-frame period. It is necessary that the period be longer than a maximum delay skew caused at the time of switching between the Work and Protection paths. In the case of a BLSR ring with a configuration of 80 km×16 nodes, for example, a maximum delay skew of about 7.5 ms is expected. In this case, the multi-frame period is so set as to be equivalent to 63 frames (7.875 ms). Namely, the multi-frame period is set to 7.5 ms at the shortest so that the sequential numbers of Protection path frames that are possibly delayed can all be monitored.

The manner of how frames are discarded through the monitoring of the sequential number will be now explained with reference to FIGS. 15A, 15B, 15C and 15D. The figures show the sequential number monitor 136 and the frame buffer 137, both appearing in FIG. 13, the Work/Protection path switch of the ADM/BLSR 121, and the sequential numbers of Work and Protection path frames.

Figure 15A:
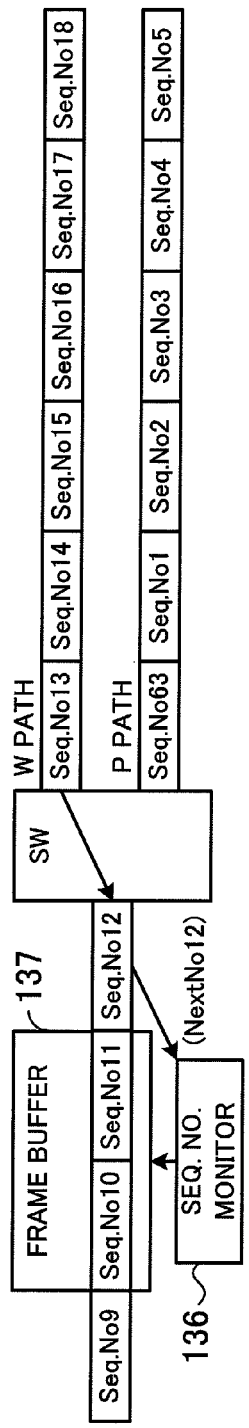
FIGS. 15A, 15B, 15C and 15D illustrate the manner of how frames are discarded through the monitoring of sequential numbers.

The sequential number monitor 136 monitors the N1 byte in the POH of the received frame to ascertain that the sequential number is incremented sequentially from "1" to "63" with the set period, as shown in FIG. 15A. Using (received sequential number)+1 as an expected value, the sequential number monitor 136 monitors the sequential numbers.

Figure 15B:
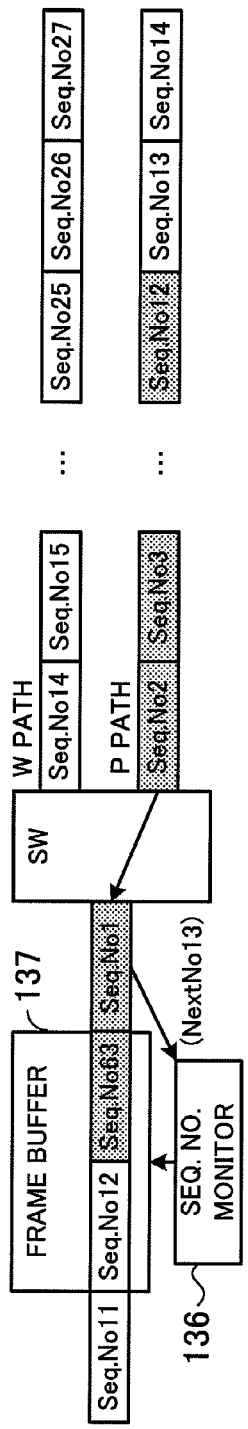

If the path is switched to the Protection path, the Protection path frames, which are out of phase with the Work path frames, are received, as shown in FIG. 15B. In the illustrated example, the Protection path frames are delayed for 13 frames with respect to the Work path frames.

The sequential number monitor 136 keeps discarding the Protection path frames until it receives a Protection path frame with the sequential number "13" which follows the sequential number "12" of the last-received Work path frame. Namely, although frames are temporarily stored in the frame buffer 137, the sequential number monitor 136 keeps discarding the temporarily stored frames until the frame with the sequential number "13" is received.

Figure 15C:
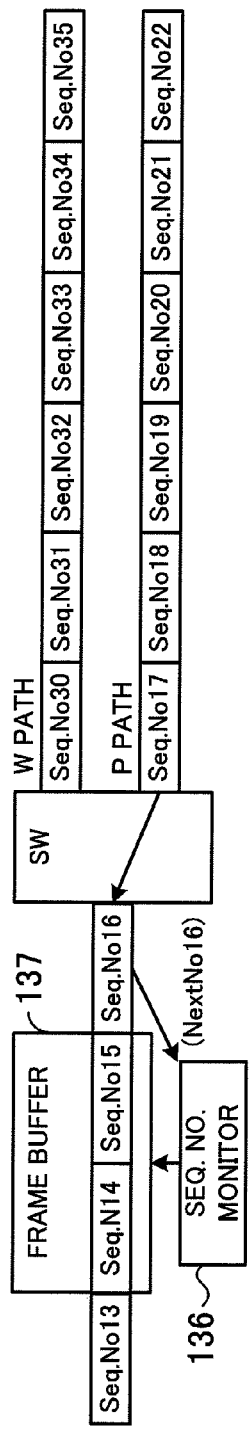

On receiving the Protection path frame with the sequential number "13", the sequential number monitor 136 stops discarding frames and delivers the received Protection path frame and the succeeding frames, as shown in FIG. 15C. Also in this case, the sequential number monitor 136 keeps monitoring the sequential number by using (received sequential number)+1 as the expected value.

Figure 15D:
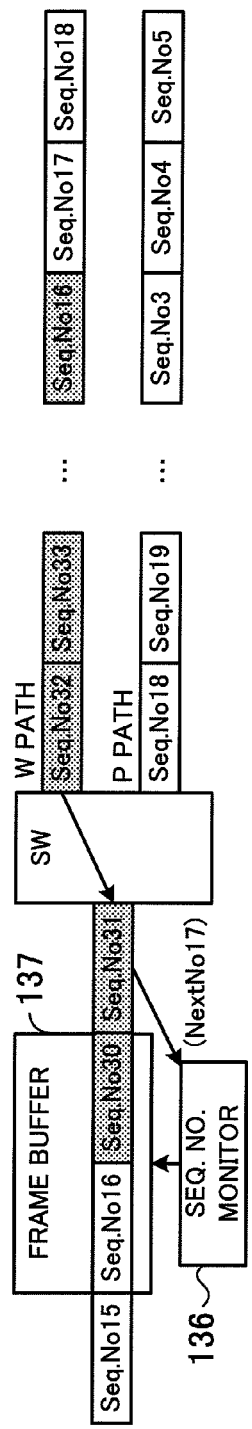

If the path is again switched from the Protection path back to the Work path, a frame (Work path frame with the sequential number "30") advanced in phase by 13 frames is received, as shown in FIG. 15D. In this case, the sequential number monitor 136 discards the Work path frames from the sequential number "30" to the sequential number "16". Namely, although frames are temporarily stored in the frame buffer 137, the sequential number monitor 136 keeps discarding the temporarily stored frames until the frame with the sequential number "17" is received.

In the example shown in FIGS. 15A through 15D, the phase difference between the Work and Protection paths is 13 frames, and in this case, the multi-frame period may be set to about 14 to 15 frames. By shortening the multi-frame period, it is possible to reduce the number of frames that are discarded when the path is switched back as shown in FIG. 15D.

Figure 16:
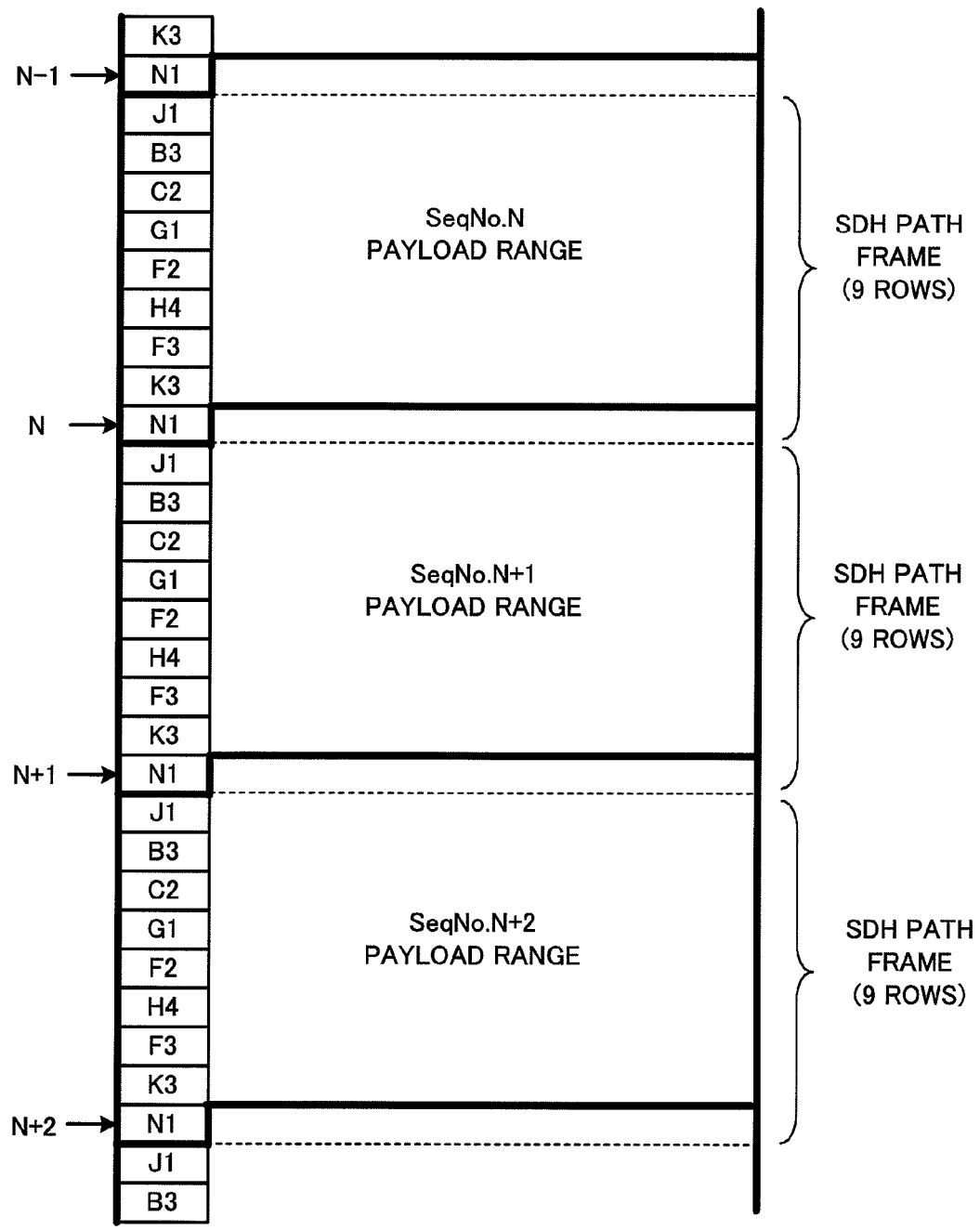
FIG. 16 illustrates the ranges of frames to be discarded.

The manner of how frames are discarded will be now explained with reference to FIG. 16. As illustrated, the sequential number designates a data range (in the figure, enclosed by the thick lines) corresponding to one frame and having the N1 byte at the end. Frame data in this range is discarded or delivered, though the data range is shifted by one row of payload relative to the SDH path frame.

Alternatively, the sequential number may be inserted into, for example, the byte immediately following the payload, instead of the N1 byte. In this case, the data range designated by the sequential number can be made to coincide with the path frame which is discarded or delivered.

While the sequential number monitor 136 checks the sequential number, the received path frame needs to be temporarily retained. It is therefore necessary that the frame buffer 137 should have a capacity large enough to store one or more frames.

Also, since the sequential numbers are inserted into the POHs of path frames and are monitored independently of the bridge or the switch, it is possible to avoid packet duplication not only in BLSR networks but also in UPSR ring networks, as distinct from the first and second embodiments.

In the transmission device of the present invention, when the bridge distributes a signal to the Work and Protection routes, discard information is inserted into the signal distributed to the Work route. The signal-dropping transmission device determines whether or not the discard information is included in the signal to be dropped, and discards the signal if the discard information is detected. This enables the transmission device to discard duplicate data, making it unnecessary to use a router or filter for discarding duplicate data.

Also, in the transmission device of the present invention, continuity information that varies sequentially is inserted into a signal to be added. The signal-dropping transmission device determines whether or not the continuity information included in the signal to be dropped shows continuity, and discards the signal in accordance with the determination result. This permits the transmission device to discard duplicate data, making it unnecessary to use a router or filter for discarding duplicate data.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission device constituting a ring network, comprising:
    add/drop multiplexer means for adding/dropping and cross-connecting signals;
    a bridge operative in response to a control signal to duplicate a signal from the add/drop multiplexer means to both work and protection routes of the ring network;
    a switch to selectively provide a signal from either the work route or the protection route to the add/drop multiplexer means;
    discard information inserter means, responsive to the duplication of the signal by the bridge, for inserting discard information into the signal to be output from the bridge to the work route, the discard information specifying that the signal carrying the discard information be discarded at a receiving transmission device that receives the signal through the work route;
    discard information detector means for determining whether or not the discard information is included in a signal that has been received via the switch and dropped by the add/drop multiplexer means; and
    signal discarder means for discarding the dropped signal, depending on whether the discard information is detected by the discard information detector means.

2. The transmission device according to claim 1, wherein the discard information inserter means inserts the discard information into N1 byte of path overhead of the signal.

3. The transmission device according to claim 1, wherein the discard information inserter means inserts the discard information into path payload of the signal.

4. The transmission device according to claim 1, wherein the discard information inserter means brings a signal path to a (Path Alarm Indication Signal) PAIS or (Unequipped) UNEQ state.

5. A transmission device constituting a ring network, comprising:
    add/drop multiplexer means for adding/dropping and cross-connecting signals;
    continuity information inserter means for inserting continuity information into a signal before the signal is added to the ring network by the add/drop multiplexer means, the continuity information varying in a predetermined sequence to uniquely identify each signal added to the ring network;
    continuity information detector means for detecting the continuity information included in a signal dropped by the add/drop multiplexer means; and
    signal discarder means for discarding the dropped signal if the continuity information detected by the continuity information detector means is identical with the continuity information detected from a previous signal dropped by the add/drop multiplexer means.

6. The transmission device according to claim 5, wherein the continuity information comprises sequential numerical values.

7. The transmission device according to claim 6, wherein the numerical values are greater in number than a value corresponding to a phase difference between signals transmitted along work and protection routes of the ring network.

8. The transmission device according to claim 5, wherein the continuity information inserter means inserts the continuity information into N1 byte of path overhead of the signal.

9. The transmission device according to claim 5, wherein the continuity information inserter means inserts the continuity information into path payload of the signal.

10. A transmission device constituting a ring network, comprising:
    an add/drop multiplexer for adding/dropping and cross-connecting signals;
    a bridge operative in response to a control signal to duplicate a signal from the add/drop multiplexer to both work and protection routes of the ring network;
    a switch to selectively provide a signal from either the work route or the protection route to the add/drop multiplexer;
    a discard information inserter, responsive to the duplication of the signal by the bridge, for inserting discard information into the signal to be output from the bridge to the work route, the discard information specifying that the signal carrying the discard information be discarded at a receiving transmission device that receives the signal through the work route;
    a discard information detector for determining whether or not the discard information is included in a signal that has been received via the switch and dropped by the add/drop multiplexer; and
    a signal discarder for discarding the dropped signal, depending on whether the discard information is detected by the discard information detector.

* * * * *